United States Patent
Vega et al.

(10) Patent No.: US 7,261,388 B2
(45) Date of Patent: Aug. 28, 2007

(54) ERROR REDUCTION BY PRINT MASKS

(75) Inventors: Ramon Vega, Sabadell (ES); Jose Luis Valero, Sant Cugat del Valles (ES); Xavier Bruch, Sant Cugat (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 11/067,653

(22) Filed: Feb. 28, 2005

(65) Prior Publication Data

US 2006/0192799 A1 Aug. 31, 2006

(51) Int. Cl.
*B41J 2/205* (2006.01)
(52) U.S. Cl. .............................. 347/15; 347/13; 358/1.9
(58) Field of Classification Search ................ 347/15, 347/41, 43, 13, 42; 358/1.2, 1.9, 3.23
See application file for complete search history.

(56) References Cited

U.S. PATENT DOCUMENTS 6,938,970 B2* 9/2005 Van den Bergen ............ 347/13
6,942,308 B2* 9/2005 Molinet et al. ................. 347/4
2004/0032455 A1* 2/2004 Silverbrook ................. 347/42

* cited by examiner

*Primary Examiner*—Lamson Nguyen

(57) ABSTRACT

In a method of printing a plurality of pages during a print job, a page-wide-array printing device having redundant dot-forming elements is used. Print masks distribute dot-forming-element activity between the redundant dot-forming elements in a manner taking into account known malfunctions of dot-forming elements to hide such malfunctions, or reduce a visible effect of such malfunctions in the pages printed. The method includes generating a plurality of print masks which are different, as they distribute the dot-forming-element activity in different ways, but are equivalent, since they are based on the same knowledge of dot-forming-element malfunctions; dividing the print job into page-sets of at least one page; and printing the different page-sets of the print job using different equivalent print masks, thereby distributing the dot-forming-element activity in different ways from page-set to page-set.

25 Claims, 13 Drawing Sheets

RANDOM MASKS (ALL NOZZLES ARE OPERATIVE):

FIRST SET OF RANDOM MASKS WITH 3rd NOZZLE OF 1st PRINT STATION INOPERATIVE:

SECOND SET OF RANDOM MASKS WITH 3rd NOZZLE OF 1st PRINT STATION INOPERATIVE:

3rd NOZZLE OF 1st PRINT STATION INOPERATIVE (KNOWN):

AS FIG 6a + 2nd NOZZLE OF 3rd PRINT STATION INOPERATIVE (NOT KNOWN):

AS FIG 6a + 2nd NOZZLE OF 3rd PRINT STATION INOPERATIVE (NOT KNOWN):

FIG. 7a

| NOZZLE #1 | NOZZLE #2 | NOZZLE #3 | NOZZLE #4 | d1 | d2 | d3 | d4 | d5 | d6 | d7 | d8 | d9 | d10 | d11 | d12 | d13 | d14 | d15 | d16 | d17 | d18 | d19 | d20 | d21 | d22 | d23 | d24 | |
|---|---|---|---|---|---|---|---|---|---|---|---|---|---|---|---|---|---|---|---|---|---|---|---|---|---|---|---|---|
| Good (25%) | Good (25%) | Good (25%) | Good (25%) | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 17a.1(regular) |
| Good (25%) | Good (25%) | Good (25%) | Good (25%) | 3 | 4 | 2 | 1 | 4 | 1 | 1 | 3 | 4 | 1 | 4 | 1 | 3 | 2 | 1 | 1 | 2 | 3 | 1 | 4 | 1 | 4 | 3 | 2 | 17a.2(random1) |
| Good (25%) | Good (25%) | Good (25%) | Good (25%) | 2 | 1 | 4 | 1 | 1 | 3 | 4 | 3 | 1 | 4 | 3 | 1 | 2 | 4 | 2 | 2 | 3 | 1 | 4 | 3 | 2 | 1 | 2 | 3 | 17a.3(random2) |

FIG. 7b

| NOZZLE #1 | NOZZLE #2 | NOZZLE #3 | NOZZLE #4 | d1 | d2 | d3 | d4 | d5 | d6 | d7 | d8 | d9 | d10 | d11 | d12 | d13 | d14 | d15 | d16 | d17 | d18 | d19 | d20 | d21 | d22 | d23 | d24 | |
|---|---|---|---|---|---|---|---|---|---|---|---|---|---|---|---|---|---|---|---|---|---|---|---|---|---|---|---|---|
| Good (43%) | ? (14%) | Bad (0%) | Good (43%) | 1 | 2 | 3 | 1 | 2 | 1 | 2 | 1 | 2 | 3 | 1 | 2 | 1 | 2 | 1 | 2 | 1 | 3 | 1 | 2 | 1 | 2 | 3 | 1 | 17b.1(regular) |
| Good (43%) | ? (14%) | Bad (0%) | Good (43%) | 2 | 2 | 1 | 2 | 1 | 1 | 1 | 2 | 3 | 1 | 2 | 1 | 1 | 2 | 1 | 3 | 2 | 2 | 1 | 3 | 2 | 2 | 1 | 2 | 17b.2(random1) |
| Good (43%) | ? (14%) | Bad (0%) | Good (43%) | 2 | 1 | 1 | 1 | 1 | 2 | 2 | 1 | 2 | 3 | 2 | 1 | 2 | 1 | 2 | 1 | 1 | 2 | 2 | 1 | 2 | 1 | 3 | 2 | 17b.3(random2) |

FIG. 7c

| NOZZLE #1 | NOZZLE #2 | NOZZLE #3 | NOZZLE #4 | d1 | d2 | d3 | d4 | d5 | d6 | d7 | d8 | d9 | d10 | d11 | d12 | d13 | d14 | d15 | d16 | d17 | d18 | d19 | d20 | d21 | d22 | d23 | d24 | |
|---|---|---|---|---|---|---|---|---|---|---|---|---|---|---|---|---|---|---|---|---|---|---|---|---|---|---|---|---|
| ? (33%) | ? (33%) | Bad (0%) | ? (33%) | 1 | 2 | 3 | 1 | 2 | 3 | 1 | 2 | 3 | 1 | 2 | 3 | 1 | 2 | 3 | 1 | 2 | 3 | 1 | 2 | 3 | 1 | 2 | 3 | 17c.1(regular) |
| ? (33%) | ? (33%) | Bad (0%) | ? (33%) | 3 | 2 | 1 | 3 | 3 | 2 | 1 | 1 | 1 | 1 | 1 | 3 | 2 | 1 | 1 | 3 | 3 | 2 | 3 | 3 | 1 | 3 | 2 | 2 | 17c.2(random1) |
| ? (33%) | ? (33%) | Bad (0%) | ? (33%) | 3 | 1 | 1 | 1 | 2 | 2 | 1 | 1 | 2 | 1 | 1 | 2 | 1 | 3 | 3 | 2 | 2 | 3 | 3 | 1 | 3 | 3 | 1 | 2 | 17c.3(random2) |
| ? (33%) | ? (33%) | Bad (0%) | ? (33%) | 1 | 2 | 3 | 1 | 1 | 2 | 2 | 2 | 2 | 3 | 1 | 1 | 2 | 3 | 1 | 1 | 1 | 3 | 1 | 3 | 1 | 1 | 3 | 2 | 17c.4(random3) |
| ? (33%) | ? (33%) | Bad (0%) | ? (33%) | 3 | 1 | 2 | 1 | 1 | 2 | 1 | 3 | 3 | 1 | 3 | 2 | 2 | 1 | 1 | 2 | 3 | 2 | 3 | 2 | 1 | 1 | 1 | 1 | 17c.5(random4) |
| ? (33%) | ? (33%) | Bad (0%) | ? (33%) | 3 | 1 | 3 | 2 | 3 | 2 | 3 | 1 | 2 | 3 | 3 | 1 | 1 | 2 | 2 | 1 | 3 | 2 | 1 | 1 | 2 | 2 | 3 | 2 | 17c.6(random5) |

| | 17c. | 17c. | 17c. | 17c. | 17c. | 17c. | 17c. |
|---|---|---|---|---|---|---|---|
| C | 2 | 2 | 6 | 5 | 4 | 6 | 3 |
| M | 5 | 2 | 6 | 3 | 5 | 2 | 5 |
| Y | 6 | 4 | 5 | 5 | 3 | 6 | 3 |

ERROR REDUCTION BY PRINT MASKS

FIELD OF THE INVENTION

The present invention relates to error reduction by print masks, and, for example, to a method of printing and a printing device using print masks to distribute dot-forming-element activity between redundant dot-forming elements.

BACKGROUND OF THE INVENTION

Digital printers produce digitally-represented images typically composed of a plurality of dots printed on a recording medium, such as paper. The quality of the final image depends on the accuracy in the amount of colorant applied and the position in which each dot is printed. It may therefore be affected by malfunctions of the printer's dot-forming elements. With the ever-increasing resolution to be achieved in modern printer technology, such faults may, however, happen quite frequently, due to the large number of dot-forming elements used; replacement parts may not always be readily available and replacement of the malfunctioning dot-forming elements would be rather extensive. Thus, a technique to compensate for malfunctioning dot-forming elements has been adopted according to which the printers are equipped with redundant dot-forming elements and, if a fault is detected in an active dot-forming element, another of the redundant dot-forming elements is used, thereby taking the role of the faulty element. The use of the redundant dot-forming elements is governed by suitable error-hiding print masks, as will be explained below.

Different techniques to print images represented by digital data are known, for example ink-jet (drop-on-demand and continuous-flow), electrophotography ("laser printing"), dye sublimation, and digital photoprint (see, for example, H. Johnson, "Mastering Digital Printing", Muska & Lipman Publishing, 2003, pp 61-79). In drop-on-demand ink-jet printing droplets of liquid ink are typically directed towards the recording medium. Thermal or piezo-induced pulses cause the droplets of ink to be ejected from the dot-forming elements. The dot-forming elements of an ink-jet printer are sometimes referred to as "nozzles". For each ink color used, a large number of such nozzles at different positions are normally arranged in one or more print heads. In electrophotographic printing a laser system typically neutralizes a part of a negatively charged surface of a transfer member, normally a rotating drum, conforming with the image to be printed, which is then able to pick up negatively charged toner particles. The toner particles on the drum are then transferred to the recording medium. The dot-forming elements of an electrophotographic printer may be individual laser elements of the laser system (e.g. laser diodes) which neutralize the individual dots on the drum, corresponding to the image dots.

Page-wide-array printers typically have an array of dot-forming elements extending over a width which is at least the full width of the recording medium. The array may be made up of one print head, or may be segmented in several print heads.

In principle, it would be sufficient to equip a printer with only one dot-forming element for each longitudinal raster line of dots to be printed (and, of course, for each ink color); this would form a minimum set of dot-forming elements. However, printers are often equipped with redundant dot-forming elements, i.e. have more than the minimum set, and can use any one of the two or more redundant dot-forming elements to print a certain dot. Alternatively, such a redundancy can also be achieved by a multipass-print operation in which a certain dot may either be printed in the first, second, third, etc. pass. The distribution of the print activity between the redundant dot-forming elements, or between the different passes, is governed by what is called a "print mode". A print mode typically includes one or more print masks and a definition how these print masks are to be applied. A print mask, in this context, is no physical mask which, for example, would obstruct the path between dot-forming elements and the recording medium, but is rather an array of logic control-data which defines a pattern of image dots that may be printed by a certain set of the redundant dot-forming elements, or in a certain pass. There are several ways of how a print mode may be represented. In a simple representation, a separate print mask is assigned to each set of the redundant dot-forming elements, or each pass, and the cells of the array (corresponding to a certain dot) may only have two values, either logic-0 or logic-1, meaning that the corresponding dot-forming element is inactive, i.e. must not fire, or may be active, i.e. may fire, depending on the actual image content to be printed (examples of such print masks are, for example, described in the co-pending application "Compensation of lateral position changes in printing" by J. L. Molinet et al., filed on Oct. 10, 2003, Ser. No 10/683,784, and assigned to the assignee of the present application). In other representations, the masks for the different sets of the redundant dot-forming elements, or different passes, are combined into one mask, the cell contents of which indicate by which set, or in which pass, a certain dot is to be printed; e.g. a "2" in a certain cell may indicate that the corresponding dot is to be printed by the corresponding nozzle of the second set, or in the second pass (see, for example, EP 0 998 117 A2, para. [0052]). If more than one drop (of the same ink color) may be applied to one and the same dot, each cell of the print mask may contain more than one number; e.g. the first number indicates the set of nozzles, or pass, responsible for applying the first drop, the second number indicates the set or pass responsible for the second drop, etc. (see, for example, EP 0 998 117 A2, para. [0053])

Since ink-jet printers and other types of printers are only capable of a limited number of tonal levels, half toning or dither masks are used to transform input variations in the tonal levels into the form of spatially varying densities. Such masks are usually filled with discriminator values, meaning that a dot-forming element is inactive if the tone level of the respective picture element (pixel) in the input image is below the discriminator value, and that it is active if the tone level is above it. Such halftoning or dither masks may, in principle, be combined with the "redundancy masks" mentioned above.

One motivation in ink-jet printers to use nozzle redundancy and distribute the nozzle activity by means of print masks has been to avoid ink coalescence at adjacent dots which may occur with certain inks and/or recording media. This is achieved by printing only some of the dots by means of the first set of redundant nozzles, or during the first pass, e.g. according to a checkerboard pattern, giving the printed dots some time to dry, and only then printing the remaining dots by the second set of redundant nozzles, or during the second pass, e.g. according to another checkerboard pattern complementary to the first one (see, for example, the co-pending Molinet et al. application). In such a checkerboard pattern, the black fields may e.g. represent a logic-1, and the white fields a logic-0.

Another motivation has been to avoid horizontal pattern or "banding" effects in swath printers having a horizontally reciprocating print head. In such printers, for example, the use of a misdirected or weak nozzle in the swaths in a regular manner could result in a visible banding effect. Distributing the print activity to different nozzles in an irregular (or randomized) manner may reduce such banding effects. For example, EP 0 738 068 A2, U.S. Pat. No. 6,302,511 B1 and EP 0 998 117 A2 disclose the use of irregular, or random, masks to distribute print activity in swath printers to avoid banding effects.

The use of nozzle redundancy and print-activity-distributing print masks, as described above, also enables known nozzle-errors (such as misdirected, weak or inoperative nozzles) to be compensated, or "hidden". For example, in a printer with two sets of nozzles (i.e. with a redundancy of one), the dots of each raster line may be printed by the first or the second print nozzle associated with this raster line, and, for example, checkerboard print masks will cause the first and second nozzles to be alternately used. If it is known, however, that one of these nozzles, e.g. the second nozzle, is faulty (such faults may, e.g., be detected by an optical analysis of print-outs made, or an acoustic analysis of the drop noise), the other nozzle, here the first nozzle, may also take the role of the second nozzle, i.e. print all the dots of the raster line in question. This may be achieved by modifying the first (e.g. checkerboard-like) print mask such that all fields of the raster line considered here are set to "black" (logic-1), and that the corresponding fields of the second print mask are set to "white" (logic-0) (see, for example, the co-pending Molinet et al. application). As a result, the line may be correctly printed, although one of the nozzles associated with this line is inoperative (incidentally, the fact that ink may now coalesce is acceptable since this is normally less noticeable than missing dots; furthermore, this effect can be reduced if a higher redundancy is available, for example three, four, five, . . . redundant nozzles or passes). It is also known to modify the irregular or randomized masks used to reduce horizontal-banding effects in swath printers to hide faulty nozzles (see, for example, U.S. Pat. No. 6,302,511 B1 and EP 0 998 117 A2).

Another application of print masks has been proposed in U.S. Pat. No. 6,601,935 B2 according to which, when one and the same pattern is to be printed repeatedly, print masks tuned to the pattern evenly distribute the frequency of use of the nozzles so that the lifetime of the print head is prolonged.

The known techniques to hide errors by nozzle redundancy and activity-distributing print masks rely on a prior knowledge of the nozzle status, in order to be able to define the print masks such that they cause the good nozzles to take the role of the faulty ones. Since the nozzle status may change during a print job, but a detection of the nozzle status may take some time, the correct nozzle status is not always known in high-throughput printers during a print job.

SUMMARY OF THE INVENTION

The invention provides a method of printing a plurality of pages during a print job. The method comprises using a page-wide-array printing device having redundant dot-forming elements and using print masks to distribute dot-forming-element activity between the redundant dot-forming elements in a manner taking into account known malfunctions of dot-forming elements by not using, or only using less frequently, dot-forming elements with known malfunction; generating a plurality of print masks which are different, as they distribute the dot-forming-element activity in different ways, but are equivalent, since they are based on the same knowledge of dot-forming-element malfunctions; dividing the print job into page-sets of at least one page; and printing the different page-sets of the print job using different equivalent print masks, thereby distributing the dot-forming-element activity in different ways from page-set to page-set.

According to another aspect, a method is provided of printing a plurality of pages during a print job. The method comprises using a page-wide-array printing device having dot-forming elements operable with redundancy, and using print masks to distribute dot-forming-element activity in a manner taking into account known malfunctions of dot-forming elements by not using, or only using less frequently, dot-forming elements with known malfunction; generating a plurality of print masks which are different, as they distribute the dot-forming-element activity in different ways, but are equivalent, since they are based on the same knowledge of dot-forming-element malfunctions; dividing the print job into page-sets of at least one page; and printing the different page-sets of the print job using different equivalent print masks, thereby distributing the dot-forming-element activity in different ways from page-set to page-set.

According to another aspect, a page-wide-array printing device is provided. The printing device has redundant dot-forming elements and is arranged to use print masks to distribute dot-forming-element activity between the redundant dot-forming elements in a manner taking into account known malfunctions of dot-forming elements by not using, or only using less frequently, dot-forming elements with known malfunction. The print job comprises a plurality of pages to be printed. The printing device is arranged to generate a plurality of print masks which are different, as they distribute the dot-forming-element activity in different ways, but are equivalent, since they are based on the same knowledge of dot-forming-element malfunctions. It is arranged to divide the print job into page-sets of at least one page, and to print the different page-sets using different equivalent print masks, thereby distributing the dot-forming-element activity in different ways from page-set to page-set.

According to another aspect, a page-wide-array printing device is provided. The printing device has dot-forming elements operable with redundancy, and is arranged to use print masks to distribute dot-forming-element activity in a manner taking into account known malfunctions of dot-forming elements by not using, or only using less frequently, dot-forming elements with known malfunction. The print job comprises a plurality of pages to be printed. The printing device is arranged to generate a plurality of print masks which are different, as they distribute the dot-forming-element activity in different ways, but are equivalent, since they are based on the same knowledge of dot-forming-element malfunctions. It is arranged to divide the print job into page-sets of at least one page, and to print the different page-sets using different equivalent print masks, thereby distributing the dot-forming-element activity in different ways from page-set to page-set.

Other features are inherent in the methods and products disclosed or will become apparent to those skilled in the art from the following detailed description of embodiments and its accompanying drawings.

BRIEF DESCRIPTION OF THE DRAWINGS

Embodiments of the invention will now be described, by way of example, and with reference to the accompanying drawings, in which:

FIGS. 7a-c are another representation of equivalent random print masks the use of which reduces the deviation from an average image quality, according to an embodiment of the invention;

The drawings and the description of the drawings are of embodiments of the invention and not of the invention itself.

DESCRIPTION OF THE PREFERRED EMBODIMENTS

Figure 1:
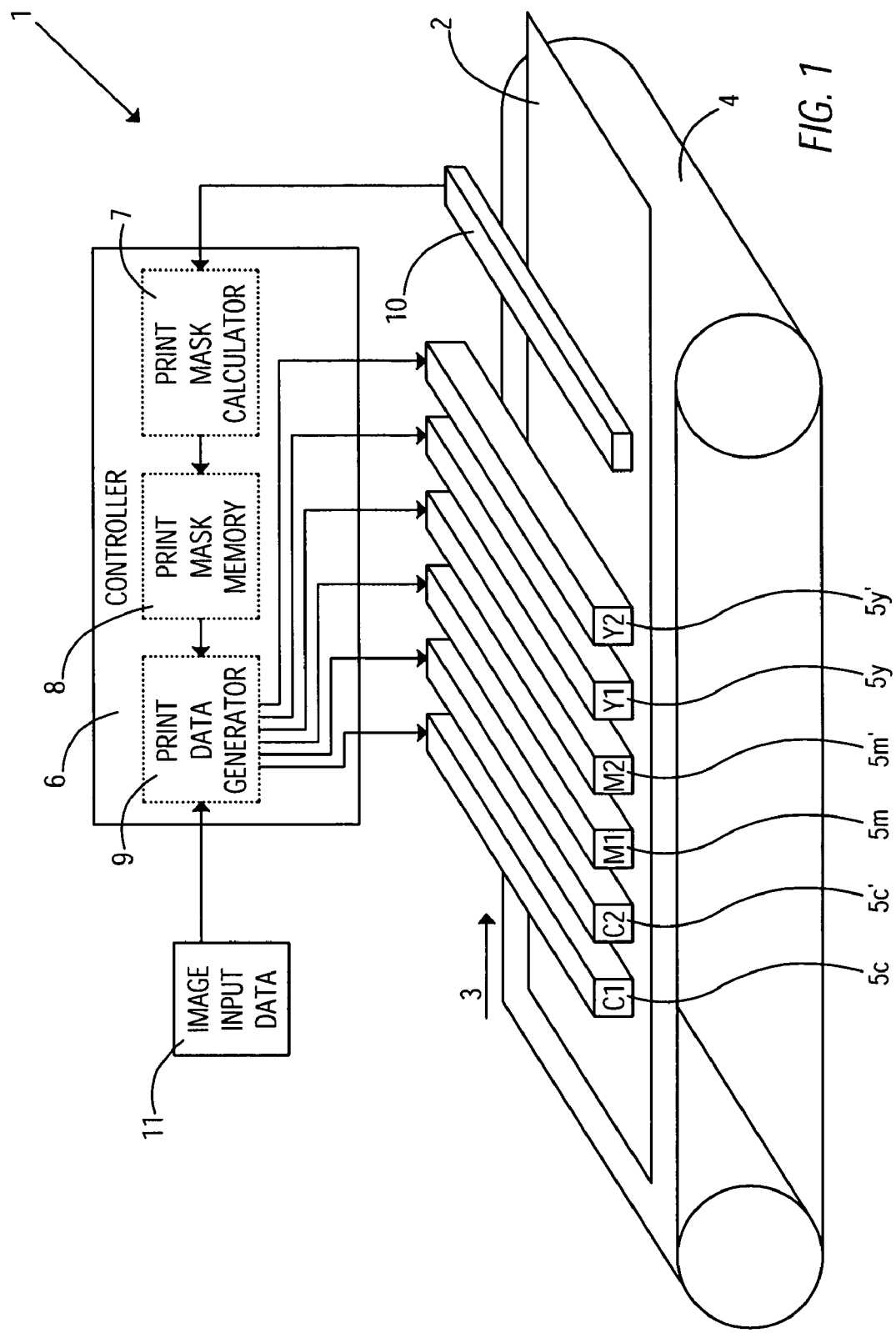
FIG. 1 illustrates a printing device according to an embodiment of the invention.

FIG. 1 illustrates a printing device according to an embodiment of the invention. Before proceeding further with the detailed description of FIG. 1, however, a few items of the embodiments will be discussed.

The embodiments described refer to page-wide-array printing devices which may be part of a copier, or a printer which may, for example, be connected to a computer and print digital data received from the computer.

The printing devices of the embodiments described have one or more arrays of dot-forming elements extending over a width which is at least the full width of the recording medium. For example, if the printer is arranged to print on paper up to the size of DIN A3 in the portrait format, the page-wide arrays have a width of at least 29.6 cm (which is the width of a DIN A5 sheet in the portrait format). In some of the embodiments, such an array is made up of one print head; in other embodiments it is segmented in several print heads.

In some of the embodiments, the dot-forming elements are, for example, ink-jet nozzles of a (thermal or piezo-type) print-on-demand ink-jet printer. In other embodiments, they are, for example, individual laser elements, such as laser diodes, of a laser printer. In the embodiments described, the printer is a multicolor-printer which has an independent set of image-forming elements for each ink color.

In the embodiments described, the printers have dot-forming-element redundancy. For example, in some of the embodiments this is achieved by equipping the printer with redundant dot forming elements (called "physical redundancy") and/or by the ability to use one and the same dot forming element to print on different raster lines in different print passes (called "functional redundancy").

In the embodiments described, the distribution of the print activity between the redundant dot-forming elements, or between the different passes, is governed by print masks. As already explained at the outset, a print mask is, for example, an array of logic control-data which defines a pattern of dots that may be printed by certain dot-forming elements (for example, the dots that may be printed by the dots of a first, second, third, etc., print head), or in certain passes.

All dot-forming elements which are able to print a drop at a certain dot together form what is called a "redundancy group". Due to the redundancy, the role of a particular dot-forming element to print at a certain dot can be taken over by any other dot-forming element belonging to the same redundancy group. This enables a known malfunction, or fault, of a dot-forming element concerned to be hidden by defining, by means of the print mask used, that the print activity of the faulty nozzle is to be taken over by one or more properly-working nozzles of the same redundancy group. Thus, in the embodiments described, print masks are used to distribute dot-forming-element activity between the redundant dot-forming elements in a manner taking into account known malfunctions of the dot-forming elements by not using, or only using less frequently, dot-forming elements with known malfunction.

As a result of different combinations, there are normally a large number of print masks which are different, as they distribute the dot-forming element activity between the dot-forming elements within a redundancy group in different ways, but, on the other hand, are equivalent, since they are based on the same knowledge of the dot-forming-element status, and therefore hide known dot-forming-element malfunctions in the same way (i.e. they produce the same printed output).

In some of the embodiments the print masks are not regular, but are generated in a randomized manner to avoid visible artifacts which might be caused by a regular distribution of the dot-forming element activity. The probabilities (or random variables) on the basis of which the random print masks are generated depend on the known dot-forming element status. For example, if it is known that a certain dot-forming element does not work reliably, or is completely inoperative, the probability value of this dot-forming element in the randomized print-mask-generation process is set to a relatively small value, or zero. All randomly generated instances of print masks' random variables which have been generated using the same probability values are equivalent print masks since they are based on the same knowledge of dot-forming-element malfunctions.

According to the embodiments described, a plurality of such equivalent print masks is generated. In the embodiments described, such a set of equivalent print masks is generated at, or before, the beginning of the print job. A print job is to be understood in the context of the described embodiments as a task to produce several (identical or different) printed pages in a coherent print run, for example, in response to a single request to print several pages. In some of the embodiments, for example, a set of print masks is used which has already previously been generated to perform a previous print job. In some embodiments, the generation of a new set of equivalent print masks is only triggered if a dot-forming-element status change has been observed, and if no such status change is observed, an existing set of print masks reflecting the (unchanged) status may continuously be used. In such embodiments, there may be a considerable period of time between the generation of the equivalent print masks and the beginning of the print job concerned. In other embodiments, however, an equivalent set of print masks is generated at the start of a print job, for example in response to receipt of a request to perform the print job. The generation is then based on the status of the dot-forming element known at that moment. Since it may take some time to generate the print masks before the actual printing can commence, in such embodiments it may also first be ascertained whether a status change has occurred with respect to an already existing set of equivalent print masks, and only if this is the case is a new set of print masks generated; otherwise the already existing print masks may continue to be used.

In the embodiment described, the pages of the print job are then printed using different masks from among the equivalent print masks. In other words, during the print job a print mask that is currently being used to perform the printing is replaced by another of the stored equivalent print masks as a consequence of which the dot-forming-element activity is distributed between the redundant dot-forming elements in different ways when the print job's pages are printed.

In some of the embodiments, a different print mask is used for each page of the print job. If the number of pages exceeds the number of pre-generated and stored print masks, these print masks may be re-used one or more times during the print job. In some of the embodiments, this re-use, or the selection of print masks from among the stored print masks in general, is made in a regular manner, in other embodiments it is made in a randomized manner. In still other embodiments, groups of consecutive pages (e.g. two, three, four, etc. consecutive pages) are printed with one and the same print mask, and the next group of consecutive pages is then printed with another of the equivalent print masks stored. In still further embodiments, the groups of pages printed with the same print mask may be interlaced with each other (for example, a first print mask is used to print pages 1, 4, 7, a second print mask to print pages 2, 5, 8, a third print mask to print pages 3, 6, 9, etc. Such single pages and groups of pages which are printed on the basis of the same print mask are here called "page-sets".

As mentioned above, the printer of the embodiments described is a multi-color-printer which has an independent set of image-forming elements for each ink color. Consequently, there are also individual print masks for the different ink colors to define the distribution of the dot-forming element activity between the dot-forming elements within the redundancy groups of the different colors. The print masks used to print the different colors of a certain page-set are called a "color mask tuple". A set of equivalent print masks is generated for each color, and the page-sets of a print job are printed using different print masks from among the equivalent print masks, i.e. different color mask tuples, for different page-sets of the print job. In some of the embodiments, when a color mask tuple is replaced by another one, all the tuple's print masks are replaced. In other embodiments, however, only one or more of the tuple's print masks, but not all of them, are replaced. In some of the embodiments in which print masks are re-used in a print job, as explained above, the same color mask tuples are re-used. For example, assume that, in a printer with three ink colors, four equivalent print masks, 1, 2, 3 and 4, are generated for each color, and that the first four page-sets are printed with color mask tuples as follows: (1, 1, 1), (2, 2, 2), (3, 3, 3) and (4, 4, 4), wherein the first number in each bracket refers to the print mask for the first color, the second one refers to that for the second color, etc. In embodiments in which the color mask tuples are re-used, the next page-sets are, for example, printed by using again (1, 1, 1), (2, 2, 2), (3, 3, 3), etc. In other embodiments with random selection of the color mask tuples, the page-sets may be printed by using a random sequence, for example (3, 3, 3), (4, 4, 4), (6, 6, 6), (3, 3, 3), (5, 5, 5), etc.

In still other embodiments, a higher degree of irregularity in the re-use of print masks is achieved by forming new combinations of the equivalent masks for the different colors, i.e. by forming new color mask tuples in a regular or randomized manner. For example, in a randomized tuple generation, the page-sets may be printed, for example, by using random combinations, such as (4, 3, 2), (3, 4, 3), (1, 2, 1), (3, 4, 3), (1, 4, 4), (2, 4, 3), etc.

The status of dot-forming elements may change during a print job. Normally, such a status change will be a failure, or a degradation, of a dot-forming element which previously was operative (in rare cases, a dot-forming element's status may improve, but this is of less interest here since a failure to notice such an improvement will typically have no impact on the image quality). Normally, it takes some time to detect such a status change, and even if it has been detected, it takes some time to generate new error-hiding print masks taking into account the new status. In some of the embodiments, the printer is a high-throughput (high-speed) printer, for example able to produce more than 170 square meters of printed output per hour (sq m/hr), or more than 240 sq m/hr or even 400 sq m/hr (corresponding to about 40, 60 or 100 DIN A4 pages per minute). While such a high-throughput printer performs a print job, there is often not sufficient time to detect a status change, generate new print masks and replace the old ones currently used by them. Therefore, the knowledge on which the equivalent print masks used during the print job are based often does not reflect the actual nozzle status, and is thus imperfect. However, due to the use of different equivalent (possibly imperfect) print masks, according to the embodiments, the overall image quality (i.e. the image quality averaged over all pages produced in the print job) will be closer to an average image quality than it would be if the same (imperfect) print mask were used throughout the print job. Thus, any negative impact of this imperfect knowledge on image quality produced is reduced.

In some of the embodiments, one and the same set of equivalent masks is used throughout the entire print job. For example, an updated set of print masks may have been generated after a previous print job, or at the beginning of the present print job, and this set of equivalent print masks is then used until the end of the present print job. Such embodiments may be adequate if print jobs are relatively short compared to the typical time needed to detect status changes and generate new print masks. In other embodiments, the set of equivalent print masks used may be updated during the print job. For example, if a status change is detected during the print job concerned, a new set of print masks is generated during that print job, in a process concurrent with the current print process. When the new set, taking into account the detected status change, is generated, the current set of equivalent print masks is replaced by the newly generated one during the ongoing print job so that the new set of print masks is then used, in the manner explained above (i.e. by printing the different subsequent page-sets of the print job using different equivalent print masks of the new print-mask set). Of course, in long print jobs, this procedure may be repeated several times.

Returning now to FIG. 1, it illustrates a printing device 1, an ink-jet printer, in which a recording medium 2 is conveyed in an advance direction 3 by a conveyor belt 4. The recording medium 2 is attached to a belt 4, for example, by means of a vacuum system arranged below the surface of the conveyor belt 4. Page-wide-array print stations 5 are arranged along the conveyor belt 4. Each print station 5 has one print head, or is segmented in several print heads, with dot-forming elements (nozzles). The print stations 5 produce, in an incremental manner, by printing one or more full-width transversal raster rows at a time, an image from print data provided by a controller 6. The embodiment of FIG. 1 has six print stations 5 for two colors, namely print stations C1 and C2 for "cyan", print stations M1 and M2 for "magenta", as well as print stations Y1 and Y2 for "yellow". The print stations of the same color (C1/C2, M1/M2 and Y1/Y2) are redundant. In other embodiments, the printer has four or six colors, such as CMYK or CMYKcm, which results e.g. in eight or ten print stations (for example, when two print stations are provided for each color). The controller 6 includes a print-mask calculator 7, a print-mask memory 8, and a print-data generator 9. A page-wide nozzle-error detector 10 views printed images and forwards data representing the printed images to the controller 6. In other embodiments, nozzle-error detectors are associated with each individual print station to detect nozzle errors directly; they are, e.g., light-barrier arrays, noise detector arrays or capacitance-change detector arrays.

The print-mask calculator 7 is able to calculate sets of different, but equivalent print masks for different pages of a print job to be printed, based on nozzle-status data provided by the nozzle-error detector 10, and store them in the print-mask memory 8. The print-data generator 9 receives image input-data 11 from the outside and transforms it to print data sent to the print stations 5 to control nozzle activity during the print process. To this end, it selects that print mask among the stored print masks from the print-mask memory which is to be used for the page to be printed currently and combines the image input-data 11 with this set to generate the print data. As will be explained below, different (but equivalent) print masks are used for the different pages, or sets of pages, of a print job to reduce the deviation from an average image quality.

Figure 2A:
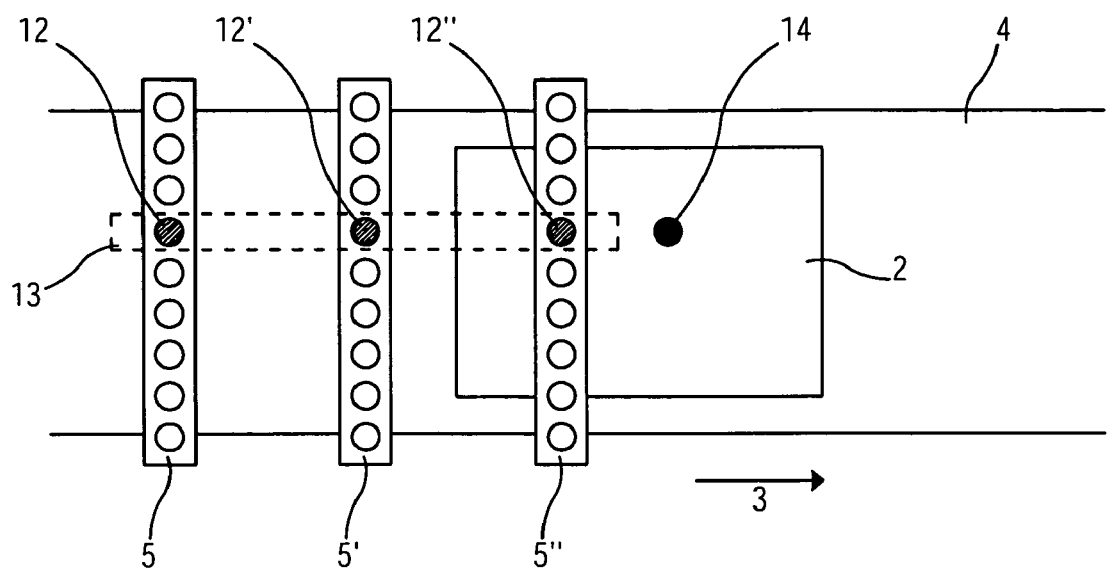
FIGS. 2a-c illustrate alternative printer designs with dot-forming-element redundancy.
Figure 2B:
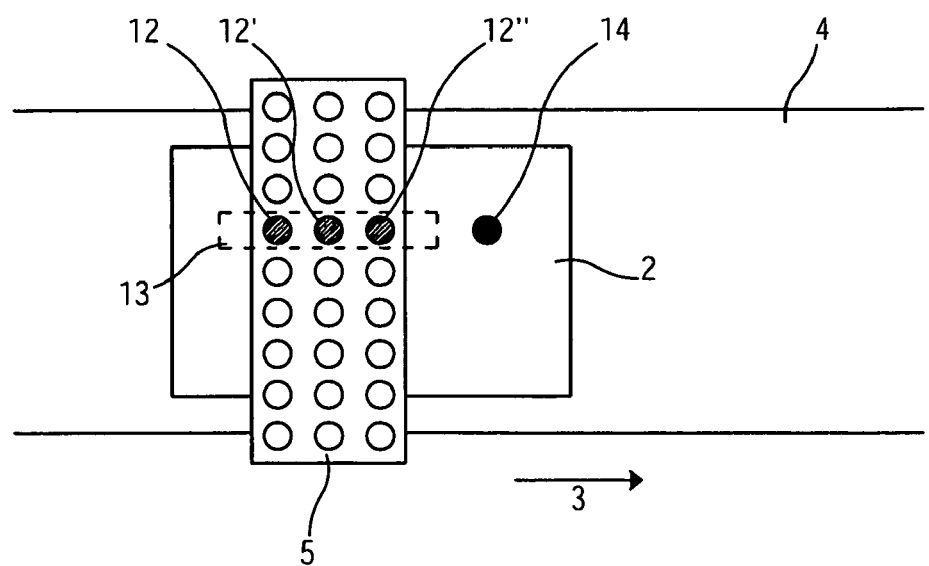
Figure 2C:
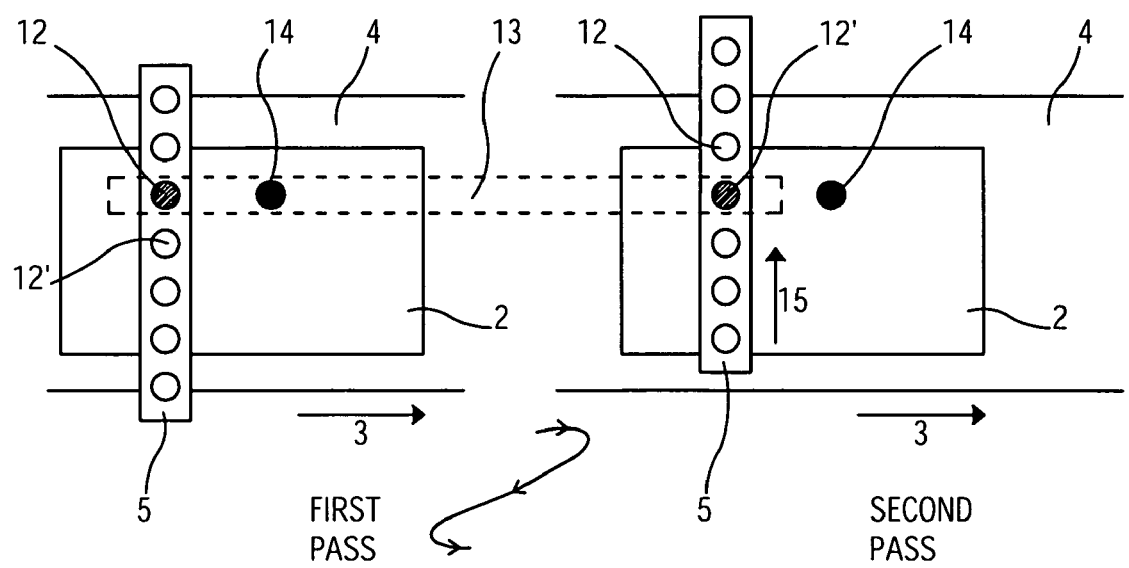
Figure 3:
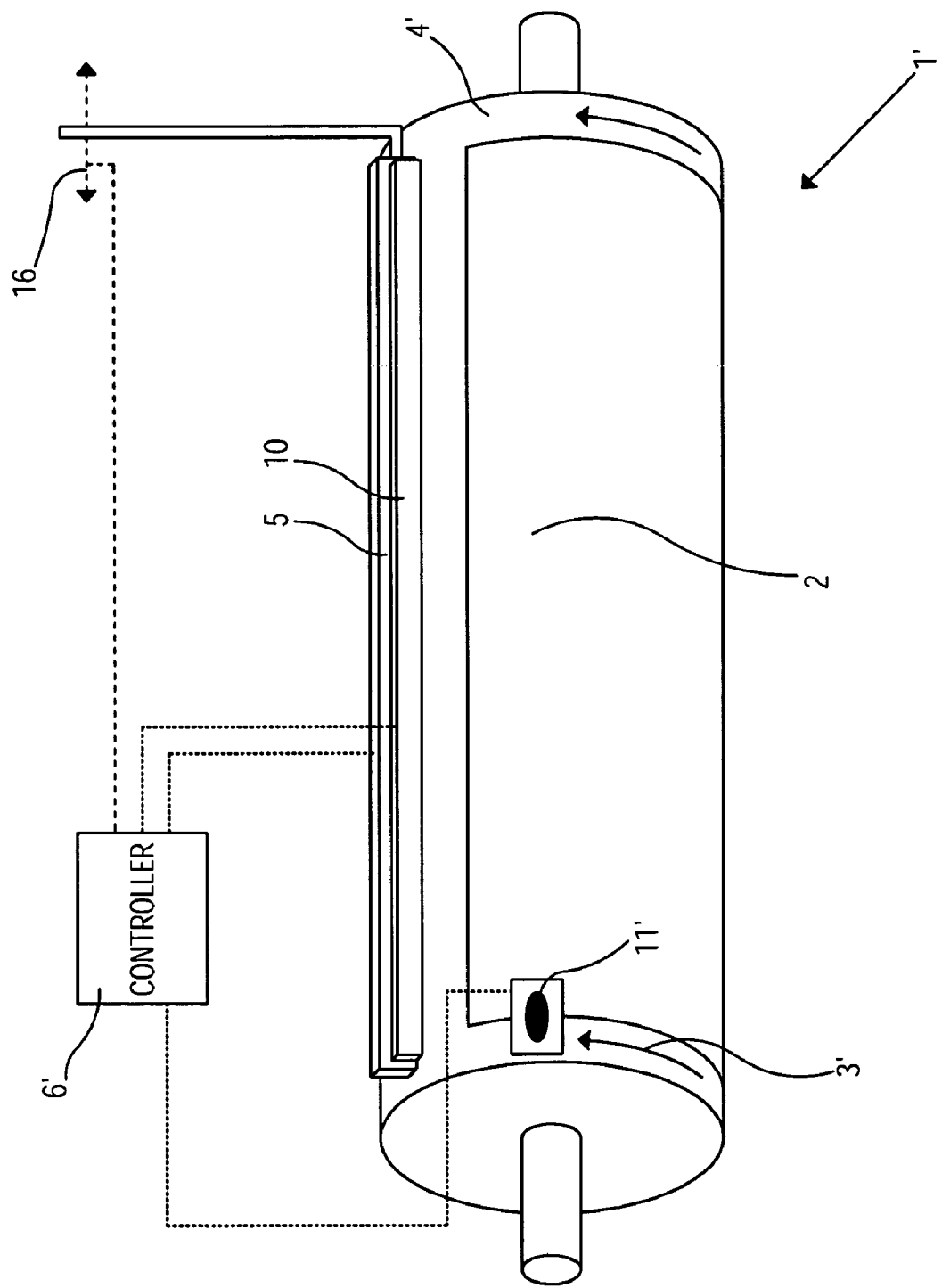
FIG. 3 illustrates another embodiment in the form of a printing device having a rotating drum.

Firstly, FIGS. 2a-2c and 3 illustrate several alternative ways to achieve dot-forming-element redundancy; FIGS. 2a-c refer to an ink-jet printer in which the recording medium is attached to a belt, and FIG. 3 refers to ink-jet printer or a laser printer in which the recording medium is attached to a rotating drum. FIGS. 2 and 3, as well as all further figures, refer only to one ink color. In color printers with several colors, as in FIG. 1, the print stations, nozzle arrays, print masks etc. shown are normally multiplied according to the number of colors; (of course, one may use print heads with nozzle arrays for different colors (e.g. a nozzle array with C nozzles, M nozzles and Y nozzles) rather than multiplying the print heads.

FIG. 2a illustrates schematically the arrangement of the print stations 5 of FIG. 1 for only one color, but with three print stations 5, 5' and 5" (by contrast, FIG. 1 illustrates a case with three colors, but with only two print stations per color). As shown in FIG. 1, in use, the recording medium 2 on the conveyor belt 4 is moved past the print stations 5, 5', 5" in the advance direction 3. Each print station 5, 5', 5" is equipped with a transversal row of dot-forming elements 12, 12', 12" ("transversal" means perpendicular to the advance direction 3, and "longitudinal" means parallel to it). The dot-forming elements 12, 12', 12" of the print stations 5, 5', 5" are longitudinally aligned; each group of dot-forming elements (in FIG. 2: each triple of dot-forming elements) 12, 12', 12" that are positioned on the same longitudinal line form what is called a "redundancy group" 13. Any one of the dot-forming elements 12, 12', 12" belonging to a certain redundancy group 13 is able to print a dot on the corresponding raster line, an example of which, denoted by "14", is shown in FIG. 2a. If, for example, dot 14 is normally printed by the dot-forming element 12 of the first print station 5, but this dot-forming element 12 has been found to be faulty by the nozzle-error detector 10 (FIG. 1), its task can be taken over by any one of the other dot-forming elements 12', 12" of the same redundancy group 13 (the same applies, of course, for a dot to be printed by 12' or 12", the task of which may be taken over by 12 or 12", or 12 or 12', respectively). Since, in the example of FIG. 2a, there are two dot-forming elements which can take over another dot-forming element's task, the arrangement of FIG. 2a has a redundancy of two. Generally, the redundancy equals the number of dot-forming elements belonging to a redundancy group reduced by one.

Another embodiment, similar to FIG. 2a, is illustrated in FIG. 2b. The three transversal rows of dot-forming elements 12, 12', 12" are now combined into one common print station 5. Consequently, the groups of dot-forming elements 12, 12', 12" forming a redundancy group 13 are now located in one and the same print station. Since the spatial distance between the dot-forming elements 12, 12', 12"—and consequently the drying time between dots printed by them—is smaller than in FIG. 2a, the embodiment of FIG. 2b will typically not avoid coalescence to the extent of FIG. 2b, but it is, on the other hand, a relatively simple design by which dot-forming-element redundancy is achieved.

Other embodiments are combinations of FIGS. 2a and 2b; i.e. they have several print stations (as in FIG. 2a) of the type having several dot-forming-element rows (as in FIG. 2b). For example, an embodiment with three print stations having three dot-forming-element rows per print station has nine dot-forming elements per redundancy group; i.e. its redundancy is eight. Such embodiments combine a relatively high dot-forming-element redundancy with relatively long drying times between dots printed at different print stations, due to the spatial separation of the (multiple-row) print stations.

FIGS. 2a and 2b illustrate the case of a "physical redundancy", in which the redundant nozzles are physically present; this enables an image to be printed in a one-pass operation. By contrast, FIG. 2c illustrates an embodiment with a "functional redundancy" in which one and the same dot-forming element can print dots of different raster lines in different print passes. In the embodiment of FIG. 2c, this functional redundancy is achieved by a design in which the whole print station 5, or the print heads of the print station 5, (here with a single row of dot-forming elements) can be shifted in the transverse direction (indicated by an arrow 15 in FIG. 2c). This ability to be transversely shifted should not be confused with a print head's functionality in a swath printer, since in the embodiment of FIG. 2c the print head is a page-wide-array print head which is transversely movable to achieve functional redundance. whereas a swatch printer needs to move its (non-page-wide) print head to cover the full width of the page. In the example shown, a certain dot 14 can either be printed, in a first pass, by a certain dot-forming element 12 (e.g. the third dot-forming element from the top in FIG. 2c), or in a second pass by another dot-forming element 12' (e.g. the fourth dot-forming element from the top) which has been aligned with the dot's 14 raster line by a corresponding shift of the print station 5 in the transverse direction 15 between the first and the second pass. The second pass may, for example, be achieved by retracting the recording medium 2 by means of the conveyor belt 4 and by moving it past the—now shifted—print station 5 a second time (likewise, in other embodiments the print station 5 can be moved back and forth in the longitudinal direction to achieve the desired relative movement between printing medium and print station). The (functionally)

redundant dot-forming elements 12 and 12', together with the multi-pass functionality and the print station's transverse-shift functionality described above, form a redundancy group 13. In the example of FIG. 2c, with a two-pass operation, the redundancy is one.

In still other embodiments, functional redundancy, as shown in FIG. 2c, is combined with physical redundancy, as shown in FIGS. 2a and/or 2b. For example, a printer according to FIG. 2c is equipped with more than one (transversely movable) print stations 5, as shown in FIG. 2a, and/or with print stations 5 having more than one nozzle rows, as shown in FIG. 2b. For example, an embodiment corresponding to FIG. 2c, but with a print station according to FIG. 2b, has a redundancy of five.

FIG. 3 illustrates an alternative type of ink-jet printing device 1' in which the recording medium 2 is attached to a rotatable drum 4', rather than to a conveyor belt. The recording medium 2 may, for example, be attached to it by means of a vacuum system within the drum 4'. Upon rotation of the drum 4', the recording medium 2 is moved past one or more print stations 5 (which may have one or more rows of dot-forming elements, as shown in FIGS. 2a and 2b). A page-wide nozzle-error detector 10 is attached to the print station 5. An actuator 16, e.g. a piezo actuator, is arranged to enable the print station 5, or its print heads, to be shifted in the transversal (i.e. axial) direction in a controlled manner. The actuator 16 is equipped with a print-station-displacement measurement device which measures the print station's current lateral position. The actuator 16 is controlled by the controller 6' of the printing device 1', and the print-station-displacement-measurement device sends its signals back to the controller 6'. (Incidentally, the embodiment of FIG. 2c may also be equipped, in a corresponding manner, with an actuator, a print-station-displacement-measurement device and a controller to enable the print station to be transversely shifted.) In the printing device 1' of FIG. 3, functional redundancy in multi-pass operation is achieved by rotating the recording medium 2 on the drum 4' more than once past the print station 5, and by transversely shifting the print station 5 between the drum revolutions. In analogy to what has been said in connection with FIG. 2c, by equipping the print station 5 with redundant nozzles and/or by equipping the printer 1' with more than one print head 5, a mixed physical and functional redundancy is achieved. However, a printer of the drum-type shown in FIG. 3 with physically redundant nozzles and/or print heads may likewise be used without the ability to shift the print head axially, then similar to FIGS. 2a and/or 2b.

In other embodiments using different printing technologies, e.g. electrophotographic printing, which are also illustrated by FIG. 3, the rotating drum 4' is the transfer member which is able to pick up charged toner particles which are, in turn transferred to the recording medium. The dot-forming elements may then be page-wide-arrays of, e.g., laser diodes.

The embodiments described below may be based on any one of the printing-device types described in connection with FIGS. 2a, 2b, 2c and 3. To keep the following description simple, reference will mainly be made to a printer that achieves nozzle redundancy by several redundant print stations, as in FIG. 2a, but the description of the examples and embodiments applies in an analogous manner to printers with redundant nozzle arrays in one and the same print head (FIG. 2b), multi-pass printers (FIGS. 2c and 3), and printers combining two or more of the techniques of FIGS. 2a, 2b, 2c and 3.

FIGS. 6 to 9 illustrate exemplary embodiments in which print errors due to malfunctioning or inoperative nozzles are reduced by the use of different equivalent print masks during a print job. However, at first FIG. 4 illustrates an example of a usual technique to hide nozzle errors by means of print masks; this technique—which is also used in some of the embodiments—is based on the assumption the nozzle status is always correctly known.

The exemplary FIG. 4 refers to a printing device as in FIG. 2a which, however, has only two print stations and, consequently, a redundancy of one. A print mask 17 is associated with each print station, e.g. a print mask 17' is associated with the first print station, and another print mask 17" is associated with the second one. The print masks 17', 17" are generally arranged in a complementary checkerboard manner. A white checkerboard field symbolizes a logic-zero ("nozzle must not fire"), and a gray checkerboard field symbolizes a logic-one ("nozzle may fire"). The six lines of the print masks 17 correspond to print raster lines. Each row (perpendicular to the advance direction 3) of the print masks 17 controls the activity of the corresponding nozzles of the associated print station at a time; consequently, the four rows in the print masks shown in FIG. 4 define the print activity at four subsequent points of time, or, due to the recording medium's advance, defines the print activity at different print raster rows, spaced in the advance direction 3. The print masks 17 shown are sections; the actual print masks are larger. For example they correspond to one complete page to be printed; thus they may have a correspondingly large number of rows to cover the length of one page, and a correspondingly large number of lines to cover the width of one page.

Figure 4A:
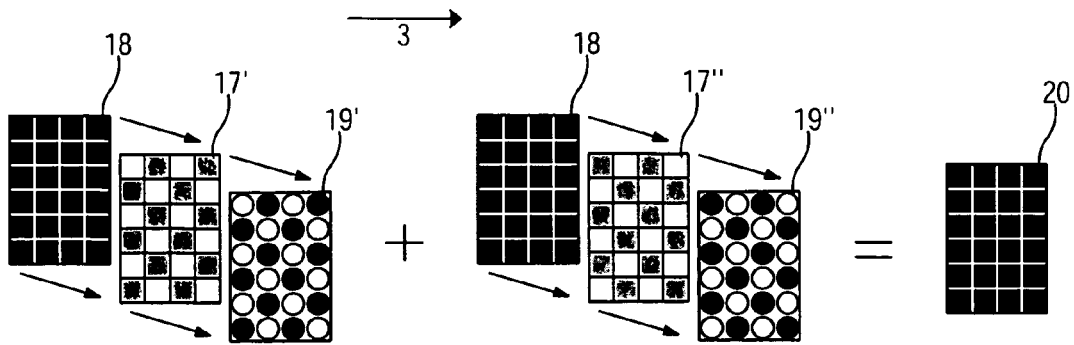
FIGS. 4a-d generally illustrate the hiding of known dot-forming-element errors by means of print masks.

FIG. 4a starts with the simplest example of two "undisturbed" checkerboard print masks 17', 17", which indicates that all nozzles are operative. In the example of FIG. 4a, a completely black (or colored) input image 18 is to be printed. The input image 18 and the print masks 17', 17" are logically combined (for example, by an AND operation) to define whether the nozzles of the corresponding print station associated with the corresponding print-mask line are to "fire" or not at the raster row associated with the corresponding print-mask row. As a consequence, the first print station prints a partial pattern 19' corresponding to the print mask 17', and the second print station prints a complementary partial pattern 19" corresponding to the complementary print mask 17'. The partial patterns 19', 19" are printed in a registered (or aligned) manner, so that the resulting combined printed pattern 20a reproduces the input image 18a exactly (i.e. it is completely black or colored, in the present example). The printing process may be carried out in an interlaced manner, i.e. when the longitudinal extension of the print masks 17', 17" exceeds the distance in the longitudinal direction of the first and second print stations, the partial pattern 19' produced by the first print station will not yet be completely printed when the second print station already starts to print its partial pattern 19".

Figure 4B:
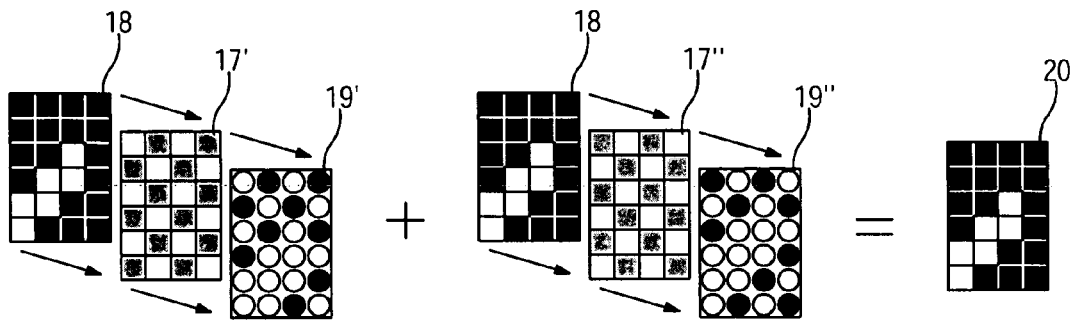

FIG. 4b illustrates a case similar to FIG. 4a in which, however, another input image 18b is to be printed. This other exemplary input image 18 has six white dots in a generally diagonal arrangement. Since the print masks 17', 17" do not depend on the image to be printed, they are the same as in FIG. 4a. However, the logical combination (AND) causes partial patterns 19b', 19b" to be printed which, apart from the diagonal-image content, conform to the input image 18, so that the printed combined pattern 20 again reproduces the input image 18b.

Figure 4C:
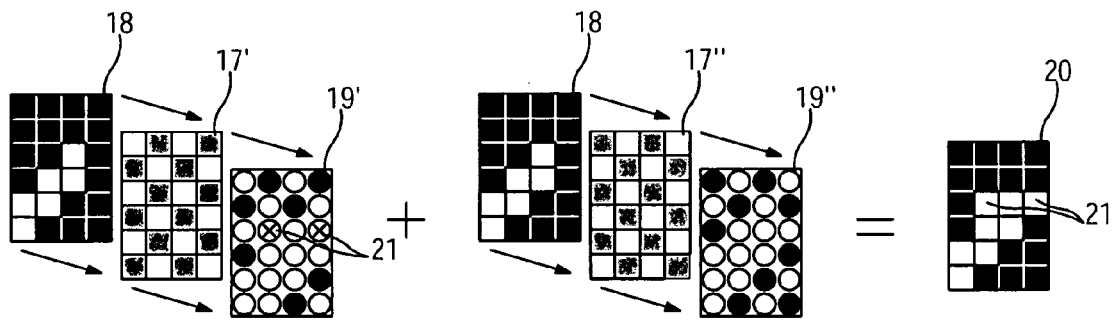

FIG. 4c illustrates a case in which one of the nozzles is inactive, for example the third noble counted (from the top) of the first print station. In FIG. 4c, error hiding is not yet applied, i.e. the print masks 17', 17" are the same as in FIGS. 4a and 4b. The input image 18 is the same as in FIG. 4b. Owing to the fact that the third noble of the first print station is not operative, two dots are not printed in the first print station's partial pattern 19" (denoted by "21"), although the logical combination (i.e. AND) of the input image 18 and the print mask 17' governs the first print head to apply ink drops to those dots 21. As a consequence, the corresponding dots 21 are left without ink in the final combined pattern 20. Therefore, the combined pattern 20 does not conform to the input image 18b, due to the defective nozzle in the first print station.

Figure 4D:
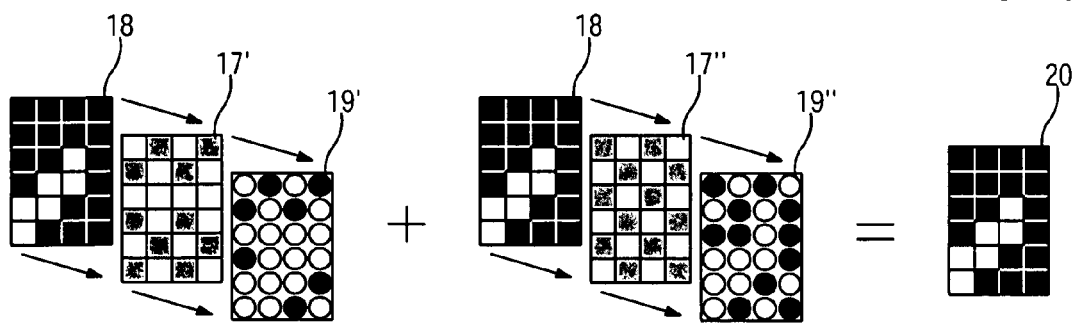

FIG. 4d illustrates that this exemplary noble defect can be hidden by modifying the print masks in a suitable manner. To produce such error-hiding print-masks, the fact that the nozzle is defective must be known to the print-mask generation system (i.e. a print-mask calculator as shown at 7 in FIG. 1), for example based on nozzle-error information provided by a nozzle-error detector (such as the nozzle-error detector shown at 10 in FIG. 1). The input image 18 is the same as in FIG. 4c. The print mask 17' of the first print station, however, is now completely blank in the third line, and the fields blanked in its third line are now black in the print mask 17" of the second print station (one could ask why blanking the line concerned is actually made if the corresponding nozzle is anyway inoperative; however, in some cases defective nozzles are not completely inoperative, but the amount of ink or the direction into which it is ejected may be incorrect, so that inactivating the nozzle by blanking the corresponding line in the print mask 17' may be useful). As a result, the role of the defective nozzle of the fist print station is now taken by the corresponding nozzle of the second print station, so that the printed combined pattern 20 is again a correct reproduction of the input image 18. Thus, by shifting nozzle activity from one to another nozzle of a redundancy group, known nozzle errors can be effectively hidden.

The print masks 17', 17" shown in FIG. 4 are repetitive, and may therefore cause visible artifacts. Such artifacts can be avoided, or at least reduced, by irregular, or random, masks, examples 17', 17", 17'" of which are shown in FIG. 5. Such irregular (or random) masks distribute the print-nozzle activity in a irregular (randomized) manner across the nozzles of a redundancy group. Furthermore, in contrast to FIG. 4, FIG. 5 illustrates a case in which the nozzle redundancy is greater than one; in the example shown, it is two. As in FIG. 4, the fist and second print masks 17', 17" are assigned to a printer's first and second print heads, whereas a third print mask 17'" is assigned to a third print head, so that the redundancy groups are now formed by three nozzles. Furthermore, as will be explained below, FIGS. 5b and c illustrate an embodiment in which different pages, or groups of pages, of a print job are printed using different equivalent print masks to reduce the deviation of the overall image quality of pages produced during the print job from an average image quality.

Figure 5A:
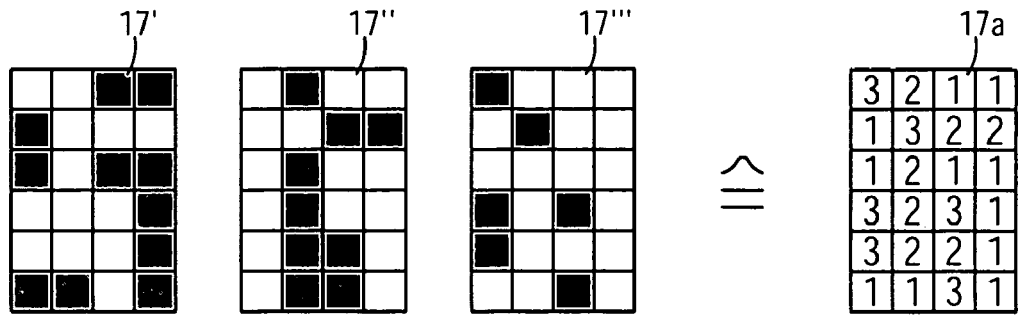
FIGS. 5a-c illustrate random masks.
Figure 5B:
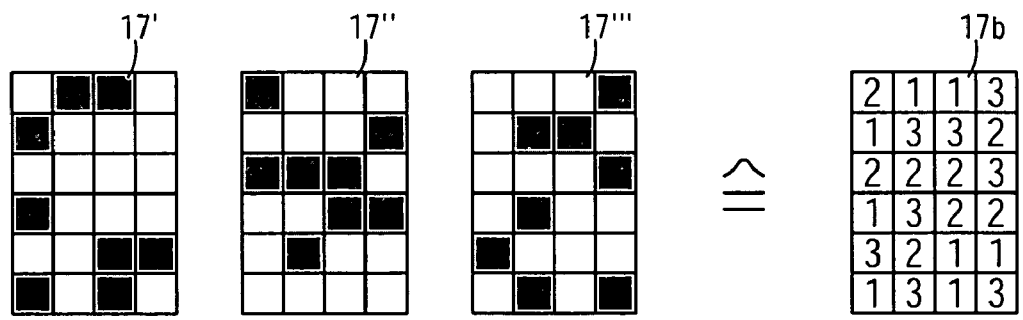

FIG. 5a illustrates an exemplary case, similar to FIGS. 4a and 4b, but now with randomized masks 17', 17", 17'". As in FIGS. 4a-4c, they have been generated on the assumption that all nozzles are working properly. As can be seen, the distribution of the white and gray fields is now irregular. Such irregular masks may, for example, be generated by use of a commonly available (pseudo-)random generator. In the example of FIG. 5a, the probability, in the print-mask generation, of setting a field to "gray" is the same for all nozzles of a redundancy group, in accordance with the assumption that the status of all nozzles of a redundancy group is the same. The probabilities of all masks 17', 17", 17'" add up, e.g. to one (100%) for each field. For example, the probability is 1/3 (33%) for all fields in FIG. 5a. Of course, due to the random character of the mask, in a particular instance, the distribution of the activity of the nozzles belonging to a certain redundancy group may be non-uniform. For example, in the three bottom lines of FIG. 5a (which define the activities of three nozzles forming a redundancy group), the first print head's nozzle takes ¾ of the activity, the second print head's nozzle takes no activity, and the third print head's nozzle takes ¼ of the activity. Nevertheless, upon averaging large randomized print masks the frequencies of gray fields will approach their generation probabilities.

Another, more condensed representation of the print masks 17', 17", 17'" is shown at the right-hand side of FIG. 5 in the form of a mask (denoted by 17a) the fields of which are filled with numbers indicating which nozzle in a redundancy group is allowed to print a certain dot (for example, a "1" in the first line of the mask 17a indicates that the first print head's nozzle of the uppermost redundancy group may fire, a "2" indicates that the corresponding second print head's nozzle may fire, etc.). It is clear from FIG. 5 that, by using such irregular print masks, regular patterns are diminished (in principle, coalescence may occur between adjacent drops printed by the same print heads if the drying time is too short; however, this is not a problem for many printer types, inks and print media).

FIGS. 5b and c are similar to FIG. 4d since it is now again assumed that the third nozzle (seen from the top) of the first print head is not functional anymore, and that this is known. Similar to FIG. 4d, this is taken into account by the print masks 17', 17", 17'", 17b, 17c in a manner transferring all the nozzle activity to the third nozzle of the second and third print heads, thereby hiding the nozzle error in the first print head. The print masks 17', 17", 17'", 17b, 17c are now randomized, as in FIG. 5a, and the error-hiding effect is achieved by adjusting the probability of the non-functional nozzle to zero (or a small value), and increasing the probabilities of the other nozzles of the redundancy group concerned, so that they still add up to one (100%). For example, in FIGS. 5b and c, the probability of the fields in the third row of the first print station's print mask 17' is set to zero, and the corresponding probabilities of the other print masks 17", 17'" are increased from 1/3 (33%) to 1/2 (50%).

Figure 5C:
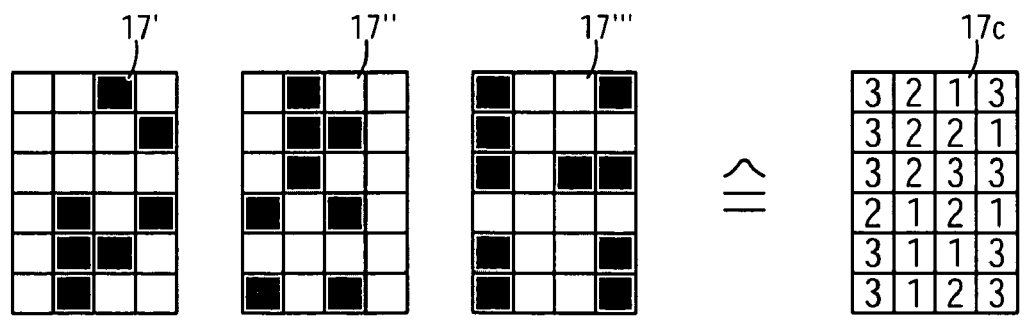

Owing to the fact that the print masks are now randomized, a multiplicity of equivalent instances of print masks can be generated. "Equivalent" means print masks generated with the same probabilities (or random variables). For example, FIGS. 5b and 5c show two different instances of sets of random masks 17', 17", 17'", 17b, 17c based on the assumption that the third nozzle of the first print station is inoperative (as in FIG. 4d), and therefore generated with the same probabilities (1/3 (33%) for all nozzles except the nozzles of the third redundancy group; zero for the first print station's third nozzle; 1/2 (50%)). However, as can be seen, the equivalent instances FIGS. 5b and 5c are completely different, due to their randomized character.

Figure 6A:
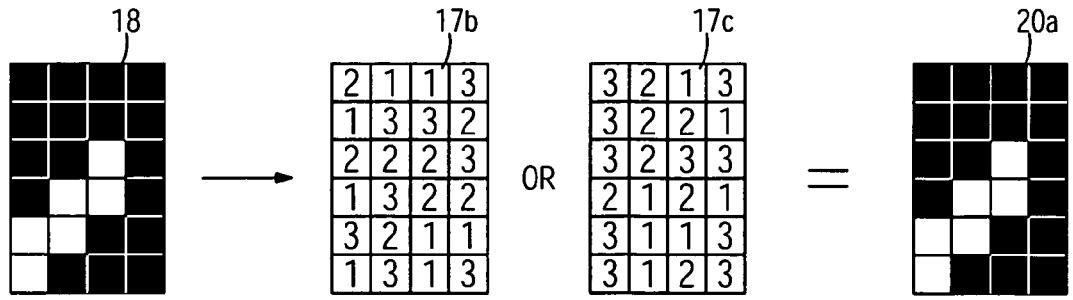
FIGS. 6a-c illustrate effects of unknown noble errors and an embodiment for reducing the deviation of the overall image quality of the printed output produced in a print job from an average image quality.

Provided that the actual nozzle status is correctly known and taken into account in the generation process of the print masks, as shown in an exemplary manner in FIG. 5, equivalent print masks, such as the print masks 17b and 17c of FIGS. 5b and 5c, provide the same print output (apart from coalescent effects, which may be ignored). This is also illustrated in FIG. 6a which shows that either of the equivalent print masks 17b, 17c, when applied to an input image (for example input image 18), lead to the same print output (for example, the printed pattern 20a in FIG. 6a). Therefore, assuming that the picture nozzle status is always correctly known, all pages of a print job could be printed in a correct manner by using one and the same error-hiding print mask, such as print masks 17b (of course, likewise print mask 17c could be used, since the print masks 17b and 17c are equivalent).

Figure 6B:
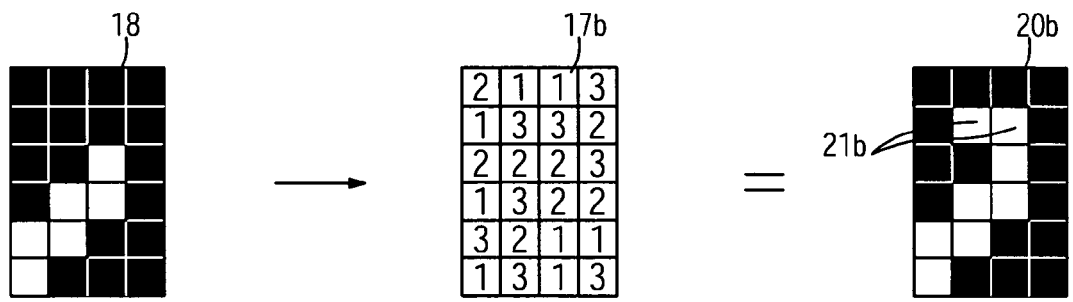
Figure 6C:
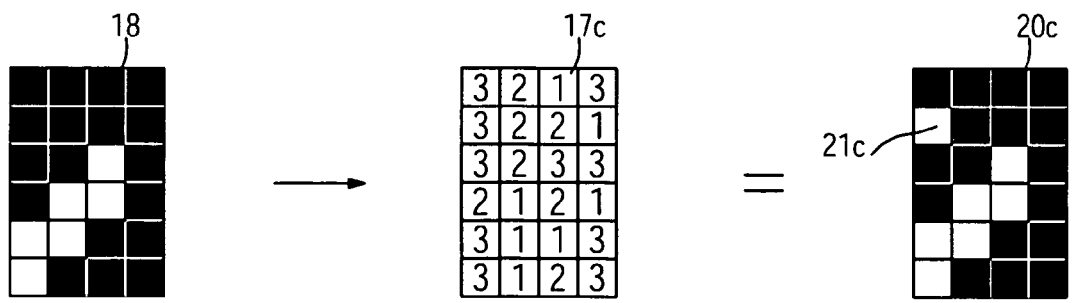

However, this is no longer true if the knowledge about the nozzle status is incomplete and, consequently, the print masks used do not reflect the actual nozzle status. This is illustrated by FIGS. 6b and 6c. In these figures it is assumed that another nozzle error (besides the already-known nozzle error in the third nozzle of the first print station) has occurred, but the old print masks are still used (this may, for example, happen if a nozzle error occurs during a print job when it cannot be immediately detected or when a new print mask taking this error into account (if it can be detected) cannot be immediately produced). In the example of FIGS. 6b and 6c, the undetected nozzle error is in the second nozzle of the third print station. Owing to the fact that this error has not been taken into account in the equivalent print masks 17b and 17c, they will allow this nozzle to fire, at 21b and 21c, but since they do not shift the print activity to the other nozzles of the same redundancy group, the dots 21b, 21c will be not printed in the output patterns 20b, 20c. Thus, these output patterns 20b, 20c are not a correct reproduction of the input image 18.

However, although the masks 17b and 17c are equivalent with regard to known nozzle errors, they do not produce an identical output pattern, since they differ from each other due to their random character. For example, when the print mask 17b in FIG. 6b is used, two consecutive drops at 21b are missing, whereas, when the other equivalent print mask 17c in FIG. 6c is used, only one single drop at 21c is missing. Assuming that, for example, two missing consecutive drops are noticed by the user as a defect, whereas a single missing drop is not noticed, the user would find that the output pattern 20b has a reduced image quality, but the output pattern 20c has good image quality. Consequently, different instances of equivalent print masks may lead to prints with different image quality, if they do not reflect the nozzle status correctly.

This finding is now used in embodiments of the invention to reduce the deviation of the overall image quality achieved in a print job from an average image quality by printing different pages, or groups of pages (single pages and groups of pages are commonly named "page-sets") with different equivalent print masks, as will be explained in more detail below. First, further examples of equivalent error-hiding print masks are now described in connection with FIG. 7.

The print masks illustrated in FIG. 7 have different dimensions than those of FIG. 4-6. They have 24 columns, corresponding to 24 dots that may be subsequently printed, but have only one line, which means that they only refer to the nozzles of one redundancy group. Of course, analogous to what has been said in connection with FIGS. 4-6, these print masks are only sections of larger print masks, for example print masks with the dimensions of a full page to be printed. A further difference from the print masks shown in FIGS. 4-6 is that the print masks of FIG. 7 refer to a printer with a redundancy of three; e.g. each redundancy group has four nozzles, denoted by "nozzle #1" to "nozzle #4".

FIG. 7 illustrates three different groups of equivalent print masks (as explained above, "equivalent" means "based on the same nozzle status", and "nozzle status" does not necessarily mean the actual nozzle status, but the nozzle status known, for example, at, or before, the beginning of a print job).

In a first group (FIG. 7a) with print masks 17a.1 to 17a.3, the status of the four nozzles of the redundancy group considered is "Good", which means that all nozzles are set to an equal probability, adding up to 100%; i.e. they are set to a probability of 1/4 (25%) in the print-mask generation.

The second group (FIG. 7b) with print masks 17b.1 to 17b.3 illustrates that intermediate statuses may be taken into account by intermediate probabilities: two nozzles (nozzle #1 and nozzle #2) have the status "Good", one nozzle (nozzle #4) has the status "Bad", but a third nozzle (nozzle #3) has an intermediate status, denoted by "?". For example, such an intermediate status may be assigned to nozzles which have been used much more frequently than the other nozzles so that they have already reached the end of their expected life time, or which have already shown certain malfunctions, such as unstable behavior. In the example of FIG. 7b, the probability for the nozzle with intermediate status is reduced to 1/3 of that of the good nozzles. As the probabilities add up to 100%, this results in probabilities of 3/7 (43%) for the good nozzles, 1/7(14%) for the intermediate nozzle, and 0% for the bad nozzle. Consequently, nozzle #4 does not appear at all throughout the print masks 17b.1 to 17b.3, and nozzle #3 appears less frequently than the nozzles #1 and #2.

In the third group (FIG. 7c) with print masks 17c.1 to 17c.6, the nozzles #1, #2 and #3 have the same status, here the intermediate status "?", whereas nozzle #4 again has the status "Bad". The probability of the bad nozzle is again 0%, and the other nozzles have equal probabilities, adding up to 100%, i.e. 1/3 (33%). Consequently, in the print masks 17c.1 to 17c.6 nozzle #4 does not appear at all, whereas the other nozzles #1, #2 and #3 appear equally frequently.

In each of the FIGS. 7a, 7b and 7c, the first print mask is a regular (or repetitive) print mask, as in FIG. 4. These regular print masks may cause artifacts; they are mainly shown to make the frequency of the different nozzles clearly visible. Furthermore, for each of the statuses equivalent examples of randomly generated masks are shown which are equivalent, since they are based on the same knowledge of nozzle status, and are randomly generated instances of a set of random variables (nozzle probabilities) reflecting this known nozzle status (two of such masks are shown in FIGS. 7a and 7b, and five are shown in FIG. 7c).

The different equivalent random print masks (17a.2 and 17a.3; 17b.2 and 17b.3; 17c.2 to 17c.6) are used in embodiments of the invention to reduce the deviation of the overall image quality achieved in a print job from an average image quality by printing different pages, or groups of pages, ("page-sets") with different equivalent print masks, as already described in connection with FIGS. 6b and 6c. In the present example, it may be assumed that a noticeable image-quality defect appears when ink drops on three (or more) consecutive dots are missing, but that there will be no noticeable defect if only a single drop, or two consecutive drops, are missing.

If, for example, in a high-throughput print job, nozzle #1 happens to fail during the print job, and this failure cannot be immediately noticed (or if it is immediately noticed, and new print masks reflecting this failure are not immediately available), the print job will continue not reflecting the actual nozzle status. As mentioned above, in the present example, it is now assumed that three consecutive drops will cause a noticeable defect in the printed image. As can be seen in FIG. 7c, only two of the equivalent random print masks exhibit three consecutive droplets to be printed by nozzle #1 (namely the print masks 17c.2 and 17c.4), whereas the other three print masks do not have three consecutive droplets to be printed by nozzle #1. Consequently, if a page is printed with print masks 17c.2 or 17c.4, it will have a noticeable image-quality defect, whereas printed with either one of the other print masks (17c.3, 17c.5, 17c.6) will not cause such a noticeable defect. Thus, if an entire print job were executed with print masks 17c.2 (or 17c.4), all pages would have a noticeable defect. On the other hand, if, according to the embodiment of the invention illustrated in connection with FIG. 7c, all five equivalent print masks 17c.2 to 17c.6 are alternately used to print the pages, or groups of pages, of the print job, only 2/5 of the pages printed will have a noticeable defect, whereas the remaining 3/3 of the pages are printed without such defect. Thus, the overall image quality of the print job (i.e. the image quality averaged over the different pages printed during a print job) is improved.

FIG. 8 illustrates several embodiments in which different equivalent print masks are used during a print job. A print job is to be understood here as a task to produce several printed pages, usually in response to a corresponding request by a user. The pages belonging to a print job are to be printed as fast as possible, without any significant delay between the individual pages. The image information to be printed may be the same for all pages (if several copies have to be produced, which is typically done in copiers) or may be different (if, for example, one copy of a paper document is to be produced, or one copy of an electronically-represented document is to be printed out).

In FIG. 8, the print mask memory 8 of an exemplary printer 1 (also shown in FIG. 1) shown is arranged to store several equivalent print masks, e.g. the five print masks 17c.2 to 17c.6 of FIG. 7c. These print masks are "precooked", i.e. they were already generated before the print job was started, or before the print job's first page 2 was printed. In the generation process of the print masks, the nozzle status of the printer 1, as known at that time, has been taken into account. Thus, the stored print masks are "error hiding", as far as the errors known at the beginning of the print job are concerned. A print mask selector 22 forms part of the print data generator 9 (also shown in FIG. 1). It selects different print masks from the stored equivalent print masks 17c.2 to 17c.6 and causes the print data generator 9 to prepare print data for the printer 1, using the currently selected print mask.

Figure 8A:
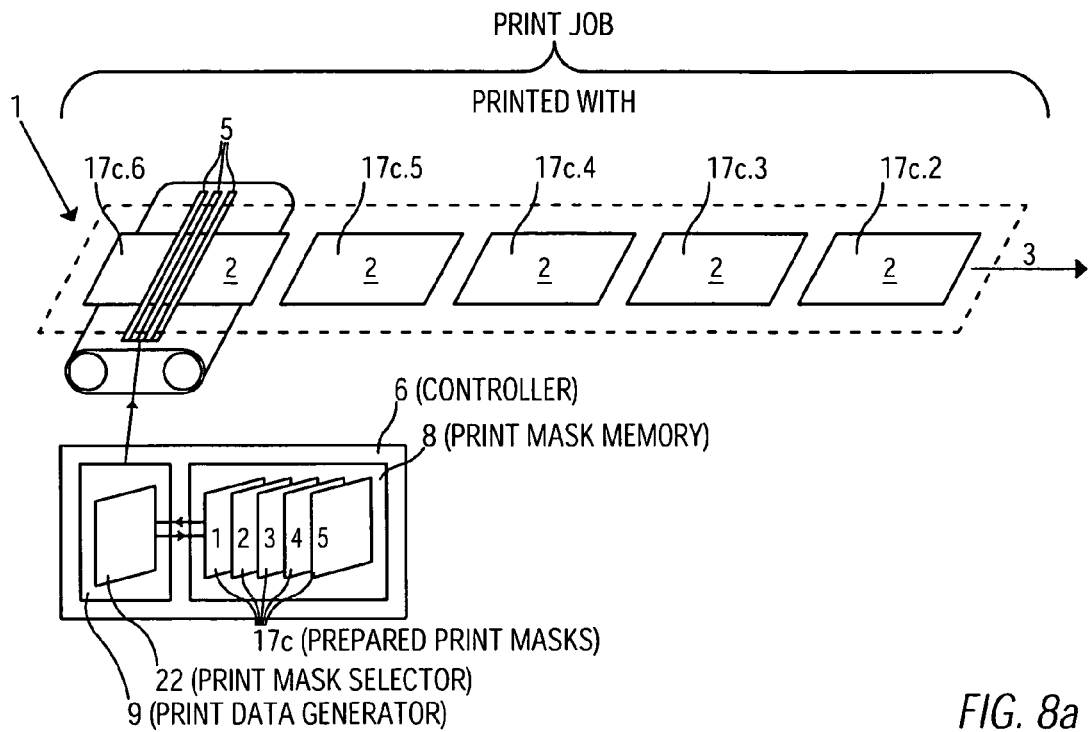
FIGS. 8a-e illustrate embodiments of print jobs carried out with different equivalent print masks.

In the example of FIG. 8a, for each individual page 2 to be printed during the print job, another print from among the stored print masks 17c.2 to 17c.6 is selected and used. In the exemplary print job of FIG. 8a, five pages 2 have to be printed. Thus, all pages 2 are printed with different print masks. If more pages are to be printed, a correspondingly larger number of print masks may be pre-cooked and stored in the print mask memory 8. Thus, in the embodiment of FIG. 8a, each individual page 2 forms what is called a "page-set".

Figure 8B:
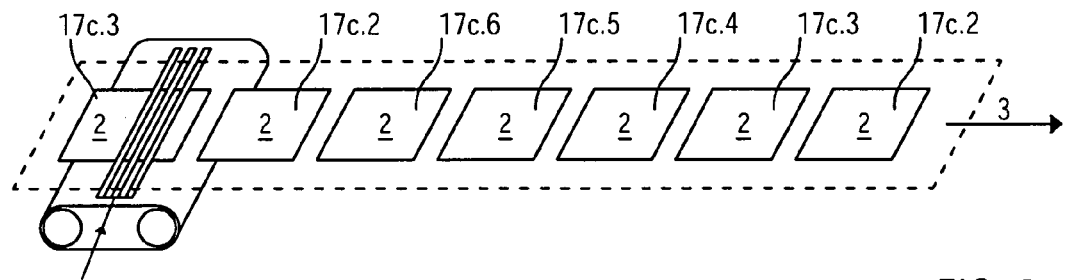

In the exemplary embodiment of FIG. 8b, however, more than five pages 2 are to be printed, but only five equivalent print masks are pre-cooked and stored. As illustrated in FIG. 8b, the stored print masks are re-used again when the page number exceeds the number of stored print masks; e.g. the print masks are repeatedly used every fifth page 2. Thus, the fist, sixth, eleventh, . . . pages form a first page-set, the second, seventh, twelfeth . . . pages 2 form another page-set, etc.

Figure 8C:
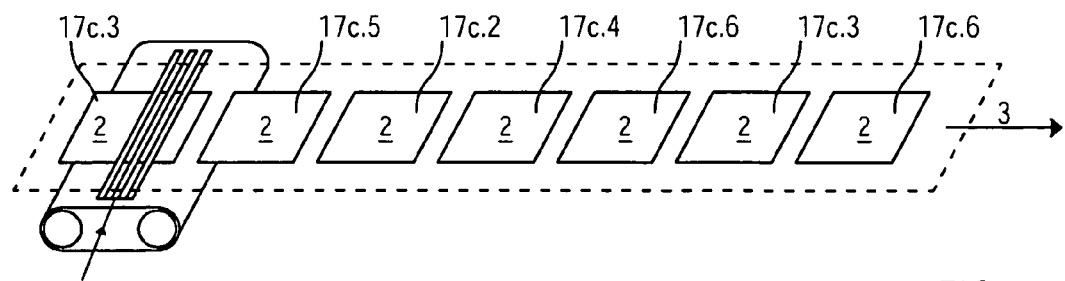

FIG. 8c shows another, slightly modified embodiment in which this repetitive structure is not regular, but randomized; as a consequence, the sequence of print masks in the second cycle, to print the sixth to tenth pages, may differ from the sequence used in the first cycle, in a random manner. Accordingly, in such an embodiment, the pages selected to be printed with one and the same print mask (i.e. the pages which belong to a certain page-set) are a random selection.

Figure 8D:
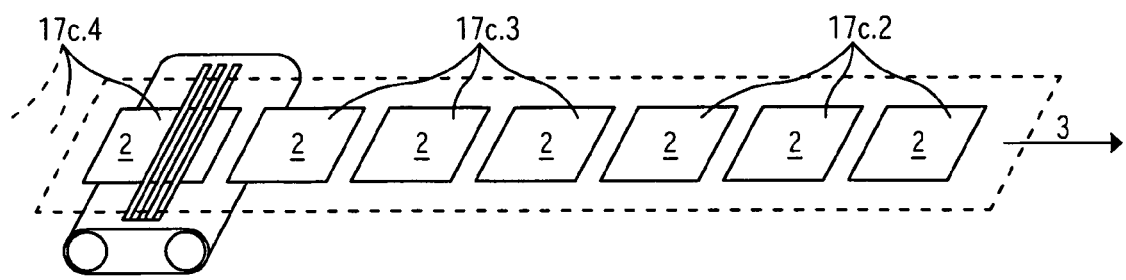

A still further exemplary embodiment is shown in FIG. 8d according to which the print masks are not changed every page, but, for example, only every third page. Thus, in the example shown, the first three pages are printed with the first mask 17c.2, the second group of three pages is printed with the second print mask 17c.2, etc. Thus, groups of three consecutive pages form what is called a page-set. Of course, if there are more groups of pages to be printed than different equivalent print masks stored, regular or randomized repetition schemes, as explained in connection with FIGS. 8b and 8c, may also be used in the embodiment of FIG. 8d.

Figure 8E:
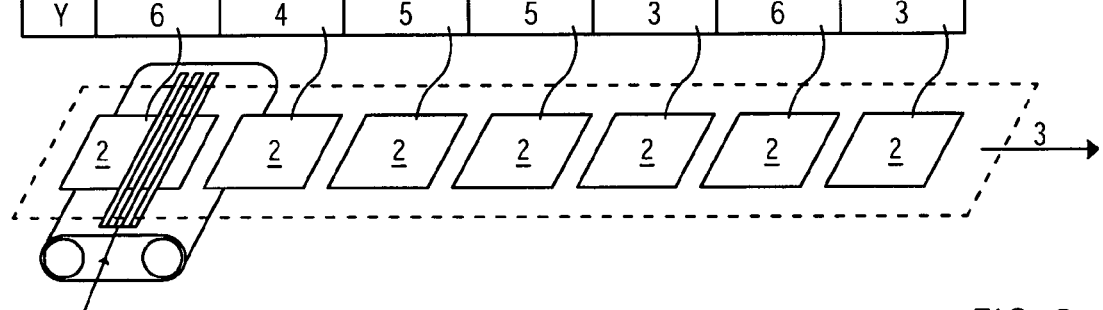

FIG. 8e illustrates the use of equivalent print masks for different ink colors; in the embodiment shown, three colors, CMY are provided. Each page-set is printed with a certain combination of color-related print masks, i.e. with a certain color mask tuple. In FIG. 8e, the print masks used for the different page-sets of an exemplary print job are shown in the form of a table; each line of the table refering to a certain color (C, M or Y), and each row of the table refering to a certain page-set. The entries in the table refer to a certain print mask from among the equivalent print masks 17.c.2 to 17.c.6 for the respective concerned. The combination of print masks in one row are a color mask tuple. In the example of FIG. 8e, the color mask tuples are random combinations of the print masks 17.c.2 to 17.c.6 for the respective colors C, M and Y.

In some of the embodiments, the printer 1 is a high-throughput ink-jet printer, able to produce more than 170 square meters of printed output per hour (sq m/hr) (corresponding to about 40 DIN A4 pages per minute). In further embodiments, the printer 1 is able to produce more than 240 sq m/hr (corresponding to about 60 DIN A4 pages per minute), and in still further embodiments it is able to produce more than 400 sq m/hr (corresponding to about 100 DIN A4 pages per minute).

In some embodiments, nozzle-status information can be obtained during a print job (e.g. by analyzing the pages printed during the print job), and a new set of equivalent randomized print masks taking into account the new status information obtained can be produced and stored in the print mask memory while the print job is still going on. For example, if it is assumed that obtaining a new nozzle status requires one minute, and calculating a new set of equivalent print masks requires another minute, the stored print masks may be updated (i.e. replaced by the more recent print masks) every two minutes. For example, in embodiments of printers able to produce 100 DIN A4 pages per minute, print-mask updates may be performed after 200, 400, 600, etc. pages have been printed.

Figure 9:
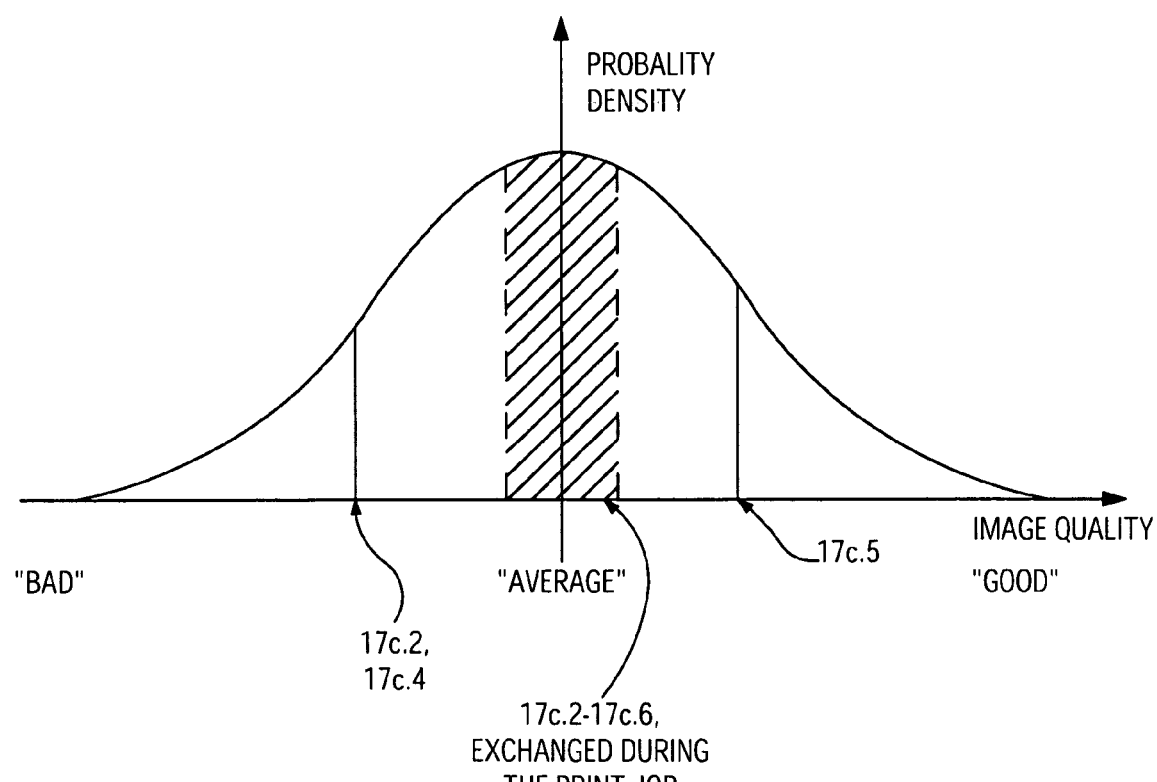
FIG. 9 is a diagram showing a probability density of the image quality achieved in the case of unknown nozzle errors.

FIG. 9 illustrates the effect of using different equivalent print masks during a print job on the image quality. It shows an (idealized) probability distribution of the "image quality" of pages printed in the presence of unknown nozzle errors, as assessed by a standard observer. The distribution is Gaussian, and has its maximum at an average image quality. Using one and the same print mask all pages of a print job may result in an unacceptable (bad) image quality. If, for example, an undetected fault of nozzle #1 occurred and the print masks 17*c*.2 or 17*c*.4 of FIG. 7*c* were used, an image quality significantly below the average image quality would be observed. Of course, if another print mask is used throughout the print job, an image quality above the average may be obtained; for example, mask 17*c*.5 would result in an image quality better than the average image quality, due to the fact that in this print mask the defective nozzle #1 only appears individually. In other words, the result of such a print job may be quite good or bad, depending on which print mask has (by chance) been used. This means that, if a "bad" print mask has been used, it may happen that the entire production of a print job is unacceptable.

By contrast, if different equivalent print masks are used during a print job, according to the described embodiments of the invention, the probability distribution of the image quality, averaged over all pages printed during the print job is within a small band around the average image quality, as shown in FIG. 9. Therefore, in the embodiments described, the image quality obtained in a print job is closer to the average image quality, a certain robustness against unknown nozzle error is achieved. Incidentally, what has been assumed regarding noticeable defects in connection with FIG. 7 (three or more consecutive missing drops would result in a noticeable defect) was only exemplary; the described effect by use of different equivalent print masks is rather a general feature and will also take place with other printers and print media, in which other combinations of missing drops may lead to noticeable defects.

Figure 10:
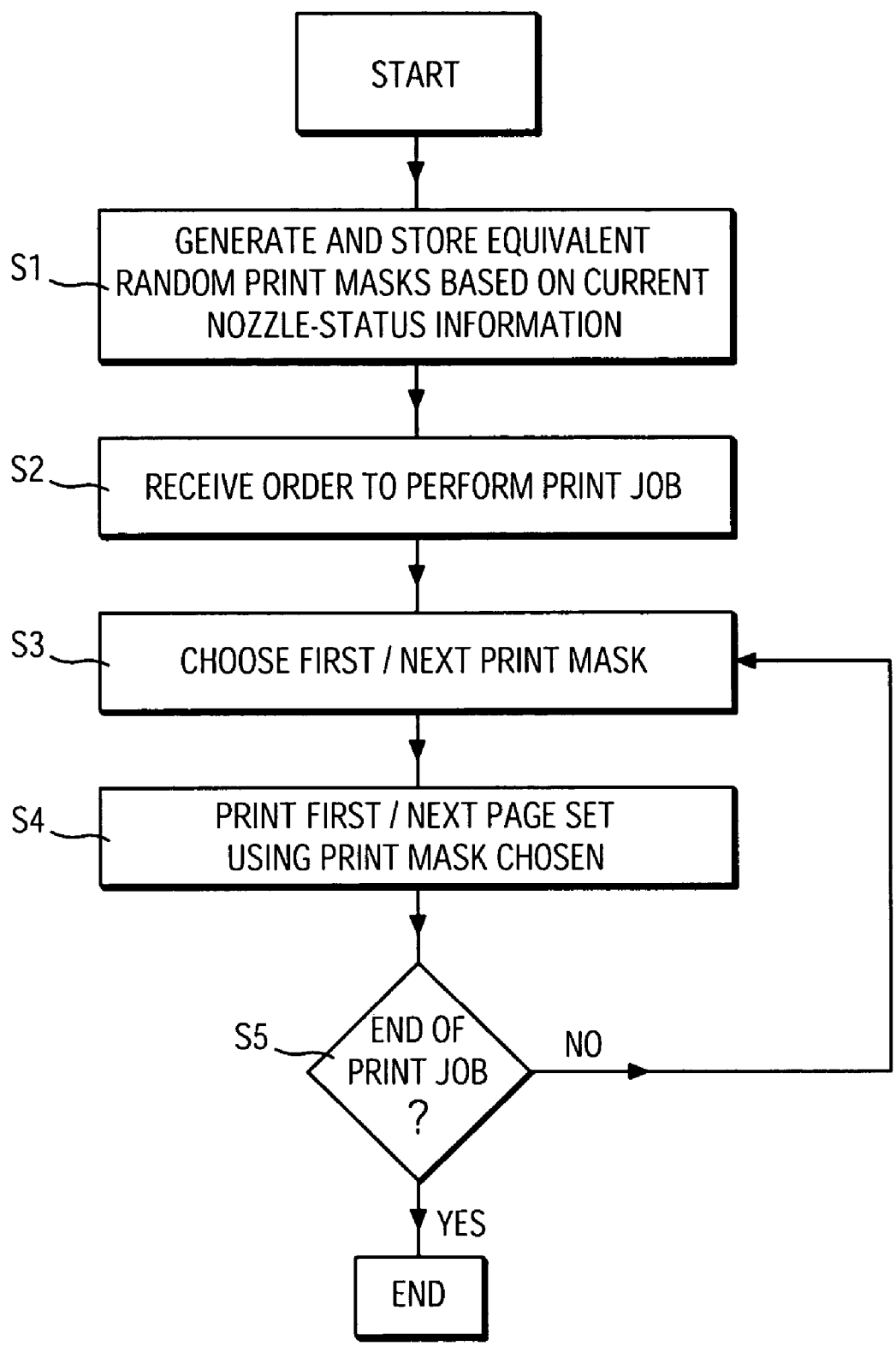
FIG. 10 is a flow diagram of a print-mask-replacing process, according to an embodiment of the invention.

FIG. 10 is a flow diagram of the print-mask-replacement process described so far. At F1, random print masks based on the currently available nozzle-status information are generated (e.g. by the print data generator 9 of FIG. 8) and stored (e.g. in the print mask memory 8 of FIG. 8). This activity is performed, in some of the embodiments, in advance of a print job to be carried out, for example at the end of a previous print job. At S2, an order to perform a print job is received (e.g. by the controller 6 of FIG. 8). For example, the order may have been generated by a user who wishes to print out an electronic document or copy a paper document, etc. At S3, the first print mask out of the already generated equivalent print masks is selected (e.g. by the print mask selector 22 of FIG. 8). The selection may be performed in a predetermined manner or, in other embodiments, in a random manner. At S4, the first page, or group of consecutive pages belonging to a page-set, is printed using the selected print mask. At S5, it is ascertained whether the end of the print job has already been reached (i.e. whether all pages of the print job have already been printed), and if this is not the case, the flow returns to S3. At S3, the next print mask is selected. Subsequently, at S4, the next page, or next group of consecutive pages belonging to a page-set, is printed. If the outcome at S5 is positive, the process is terminated.

Figure 11:
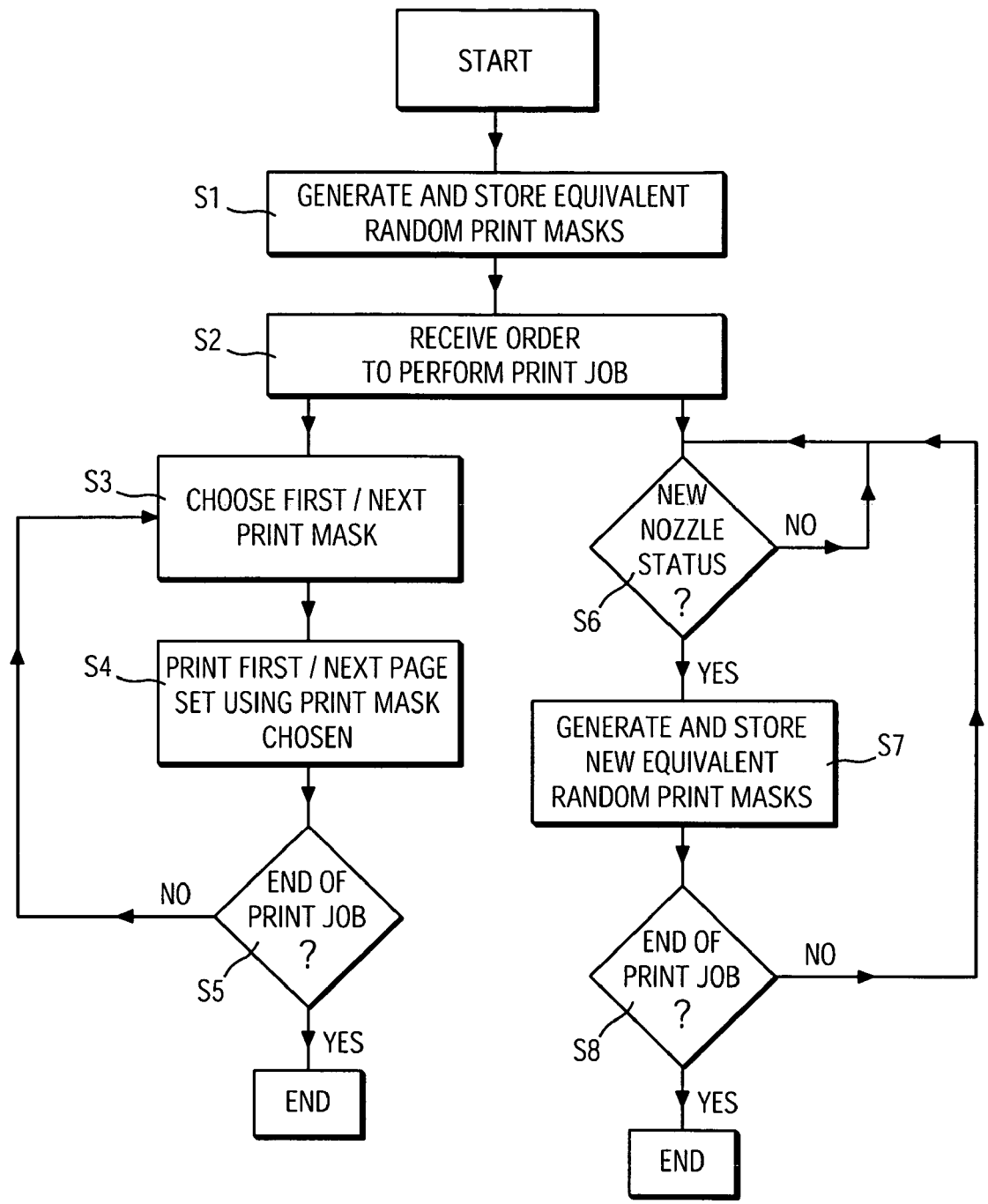
FIG. 11 is a flow diagram of another embodiment in which the stored print masks may be updated with new nozzle-status information during a print job.

FIG. 11 illustrates a flow diagram of another embodiment in which the set of equivalent random print masks may be updated during a print job. Activities S1-S5 are the same as in the embodiment of FIG. 10. In addition, a concurrent print-mask-update process, starting at S6, is performed. At S6, it is ascertained whether a new nozzle status has been detected (e.g. by means of the nozzle-error detector 10 of FIG. 1, which permanently monitors the pages printed during the print job, and detects new nozzle faults occurring during the print job). If a new nozzle status is detected (e.g. it has been detected that a particular nozzle has become inoperative during the print job) a new set of equivalent random print masks taking into account this new nozzle status is generated and stored during the print job, at S7. The new set of equivalent print masks replaces the previous set of print masks (which was generated at S1, for example, or in a previous pass through the print-mask-update process, at S7). At S8, it is ascertained whether the end of the print job has been reached. If not, the flow returns to S6 to enable a further print-mask update during the present print job, assuming that another status change is detected. If, however, the end of the print job is reached, the concurrent print-mask-update process is also terminated.

The preferred embodiments provide a certain robustness of the average print quality against unknown nozzle errors, and therefore provide a general improvement of image quality.

All publications and existing systems mentioned in this specification are herein incorporated by reference.

Although certain methods and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of printing a plurality of pages during a print job, comprising:
    using a page-wide-array printing device having redundant dot-forming elements and using print masks to distribute dot-forming-element activity between the redundant dot-forming elements in a manner taking into account known malfunctions of dot-forming elements known by not using, or only using less frequently, dot-forming elements with known malfunction;
    generating a plurality of print masks which are different, as they distribute the dot-forming-element activity in different ways, but are equivalent, since they are based on the same knowledge of dot-forming-element malfunctions;
    dividing the print job into page-sets of at least one page;
    printing the different page-sets of the print job using different equivalent print masks, thereby distributing the dot-forming-element activity in different ways from page-set to page-set.

2. The method of claim 1, wherein a malfunction status of dot-forming elements may change during the print job, however, the status change not, or not immediately, being observed or entered into the print masks in the course of the print job, the knowledge on which the equivalent print masks are based is imperfect, yet a negative impact of this imperfect knowledge on image quality finally produced is reduced since the different equivalent print masks are used.

3. The method of claim 1, wherein the different equivalent print masks are generated randomly.

4. The method of claim 1, wherein the different equivalent print masks are generated based on information about dot-forming-element malfunctions available at, or before, the beginning of the print job.

5. The method of claim 1, wherein the different equivalent print masks are generated and stored at, or before, the beginning of the print job based on information about dot-forming-element malfunctions available at, or before, the beginning of the print job, and wherein, during the print job a print mask used to print the current page-set is replaced by one of the stored equivalent print masks to print the next page-set.

6. The method of claim 1, wherein the redundancy of the dot-forming elements is higher than one, which means that two or more dot-forming elements are available to print a dot on a page.

7. The method of claim 1, wherein the different equivalent print masks distribute the dot-forming-element activity in a manner in which dot-forming elements known to have limited performance or to be malfunctioning are used less frequently than good dot-forming elements.

8. The method of claim 1, wherein the information about dot-forming-element malfunctions is updated one or more times during the print job and updated equivalent print masks are generated and used during the print job.

9. The method of claim 1, wherein the printing device is an ink-jet printer, and the dot-forming elements are drop-on-demand ink nozzles.

10. The method of claim 1, wherein multi-color printing is performed by means of several ink colors, and wherein for each ink color a set of equivalent print masks is generated, and different combinations of the equivalent print masks for the different colors are used to print the different page-sets.

11. The method of claim 10, wherein the different combinations are generated by randomly combining print masks from among the sets of equivalent print masks for the different ink colors.

12. A method of printing a plurality of pages during a print job, comprising:
using a page-wide-array printing device having dot-forming elements operable with redundancy, wherein print masks are used to distribute dot-forming-element activity in a manner taking into account known malfunctions of dot-forming elements by not using, or only using less frequently, dot-forming elements with known malfunction;
generating a plurality of print masks which are different, as they distribute the dot-forming-element activity in different ways, but are equivalent, since they are based on the same knowledge of dot-forming-element malfunctions;
dividing the print job into page-sets of at least one page;
printing the different page-sets of the print job using different equivalent print masks, thereby distributing the dot-forming-element activity in different ways from page-set to page-set.

13. The method of claim 12, wherein the pages are printed by multi-pass printing, and the redundancy is achieved by an ability of the dot-forming elements to print different dots in different print passes.

14. A page-wide-array printing device having redundant dot-forming elements and arranged to use print masks to distribute dot-forming-element activity between the redundant dot-forming elements;
wherein the print masks are arranged to distribute the dot-forming-element activity between the redundant dot-forming elements in a manner taking into account known malfunctions of dot-forming elements known by not using, or only using less frequently, dot-forming elements with known malfunction,
wherein the print job comprises a plurality of pages to be printed, and
wherein the printing device is arranged to generate a plurality of print masks which are different, as they distribute the dot-forming-element activity in different ways, but are equivalent, since they are based on the same knowledge of dot-forming-element malfunctions,
divide the print job into page-sets of at least one page,
print the different page-sets using different equivalent print masks, thereby distributing the dot-forming-element activity in different ways from page-set to page-set.

15. The printing device of claim 14, arranged such that the different equivalent print masks are generated randomly.

16. The printing device of claim 14, arranged such that the different equivalent print masks are generated based on information about dot-forming-element malfunctions available at, or before, the beginning of the print job.

17. The printing device of claim 14, arranged such that the different equivalent print masks are generated and stored at, or before, the beginning of the print job based on information about dot-forming-element malfunctions available at, or before, the beginning of the print job, and that, during the print job, a print mask used to print the current page-set is replaced by one of the stored equivalent print masks to print the next page-set.

18. The printing device of claim 14, wherein the redundancy of the dot-forming elements is higher than one, which means that two or more dot-forming elements are available to print a dot on a page.

19. The printing device of claim 14, wherein the different equivalent print masks are arranged to distribute the dot-forming-element activity in a manner in which dot-forming elements known to have limited performance or to be malfunctioning are used less frequently than good dot-forming elements.

20. The printing device of claim 14, arranged such that the information about dot-forming-element malfunctions is updated one or more times during the print job and updated equivalent print masks are generated and used during the print job.

21. The printing device of claim 14, wherein the printing device is an ink-jet printer, and the dot-forming elements are drop-on-demand ink nozzles.

22. The printing device of claim 14, which is multi-color printing device having several ink colors, the printing device being arranged to generate, for each ink color, a set of equivalent print masks, and to use different combinations of the equivalent print masks for the different colors to print the different page-sets.

23. The printing device of claim 22, arranged to generate the different combinations by randomly combining print masks from among the sets of equivalent print masks for the different ink colors.

24. A page-wide-array printing device having dot-forming elements operable with redundancy,
wherein the printing device is arranged to use print masks to distribute dot-forming-element activity in a manner taking into account known malfunctions of dot-forming elements by not using, or only using less frequently, dot-forming elements with known malfunction,
wherein the print job comprises a plurality of pages to be printed, and
wherein the printing device is arranged to generate a plurality of print masks which are different, as they distribute the dot-forming-element activity in different ways, but are equivalent, since they are based on the same knowledge of dot-forming-element malfunctions,
divide the print job into page-sets of at least one page,
print the different page-sets using different equivalent print masks, thereby distributing the dot-forming-element activity in different ways from page-set to page-set.

25. The printing device of claim 24, arranged to print pages by multi-pass printing, and being able to print different dots in different print passes, thereby achieving the redundancy.

* * * * *

UNITED STATES PATENT AND TRADEMARK OFFICE
CERTIFICATE OF CORRECTION

PATENT NO. : 7,261,388 B2  Page 1 of 1
APPLICATION NO. : 11/067653
DATED : August 28, 2007
INVENTOR(S) : Ramon Vega et al.

It is certified that error appears in the above-identified patent and that said Letters Patent is hereby corrected as shown below:

In column 5, line 8, delete "noble" and insert -- nozzle --, therefor.

In column 13, line 2, delete "noble" and insert -- nozzle --, therefor.

In column 13, line 6, delete "noble" and insert -- nozzle --, therefor.

In column 13, line 16, delete "noble" and insert -- nozzle --, therefor.

In column 13, line 34, delete "fist" and insert -- first --, therefor.

In column 13, line 50, delete "fist" and insert -- first --, therefor.

In column 17, line 65, delete "fist" and insert -- first --, therefor.

Signed and Sealed this

Nineteenth Day of August, 2008

JON W. DUDAS
*Director of the United States Patent and Trademark Office*